(12) United States Patent
Saito et al.

(10) Patent No.: US 11,550,770 B2
(45) Date of Patent: Jan. 10, 2023

(54) ANALYSIS OF TIME-SERIES DATA INDICATING TEMPORAL VARIATION IN USAGE STATES OF RESOURCES USED BY MULTIPLE PROCESSES

(71) Applicant: FUJITSU LIMITED, Kawasaki (JP)

(72) Inventors: Yuji Saito, Yokohama (JP); Tetsuya Uchiumi, Kawasaki (JP); Yukihiro Watanabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 444 days.

(21) Appl. No.: 16/579,148

(22) Filed: Sep. 23, 2019

(65) Prior Publication Data

US 2020/0110735 A1    Apr. 9, 2020

(30) Foreign Application Priority Data

Oct. 4, 2018  (JP) .............................. JP2018-189356

(51) Int. Cl.
*G06F 16/22*   (2019.01)
*G06F 16/25*   (2019.01)
(Continued)

(52) U.S. Cl.
CPC ........ *G06F 16/2237* (2019.01); *G06F 16/211* (2019.01); *G06F 16/258* (2019.01); *G06F 16/902* (2019.01)

(58) Field of Classification Search
CPC .............. G06F 16/2237; G06F 16/211; G06F 16/258; G06F 16/902; G06F 16/2477; G06F 16/1794
See application file for complete search history.

(56) References Cited

U.S. PATENT DOCUMENTS

| | | | | |
|---|---|---|---|---|
| 2005/0222840 | A1* | 10/2005 | Smaragdis | .......... G10L 21/0272 704/204 |
| 2008/0291122 | A1* | 11/2008 | Smith | .................. G09G 3/3216 345/55 |
| 2009/0313282 | A1* | 12/2009 | Bhagwan | ............ G06F 11/3442 |

(Continued)

FOREIGN PATENT DOCUMENTS

| | | |
|---|---|---|
| JP | 2009252050 A   * | 10/2009 |
| JP | 2012-159928 | 8/2012 |
| JP | 2014-78160 | 5/2014 |

OTHER PUBLICATIONS

Du et al., Time Series Clustering via NMF in Networks, SERA 2018, Jun. 13-15, 2018, Kunming, China, pp. 87-92. (Year: 2018).*

(Continued)

*Primary Examiner* — Cheyne D Ly
(74) *Attorney, Agent, or Firm* — Staas & Halsey LLP

(57) ABSTRACT

Time-series data indicating a temporal variation of an index, which indicates a usage state of each of resources that are used by multiple processes, is acquired, and an operation-data matrix including vectors is generated based on the time-series data such that each of the vectors indicates the time-series data at a predetermined time interval and includes as an element the index indicating the usage state of one of the resources at the predetermined time interval. A basis matrix including a predetermined number of basis vectors is generated by performing nonnegative matrix factorization on the operation-data matrix. Component values, which respectively correspond to the resources, indicated by each of the predetermined number of the basis vectors are extracted, and information on the extracted component values is output as usage states of the resources that are used by each of the multiple processes.

9 Claims, 28 Drawing Sheets

(51) Int. Cl.
*G06F 16/901* (2019.01)
*G06F 16/21* (2019.01)

(56) References Cited

U.S. PATENT DOCUMENTS

| | | | | |
|---|---|---|---|---|
| 2011/0276682 | A1* | 11/2011 | Ding | G06F 11/3051 |
| | | | | 709/224 |
| 2012/0041575 | A1* | 2/2012 | Maeda | G05B 23/024 |
| | | | | 700/80 |
| 2012/0191640 | A1* | 7/2012 | Ebadollahi | G06N 20/00 |
| | | | | 706/53 |
| 2012/0198447 | A1 | 8/2012 | Osogami et al. | |
| 2012/0290879 | A1* | 11/2012 | Shibuya | G05B 23/021 |
| | | | | 714/26 |
| 2013/0159221 | A1* | 6/2013 | Thompson | G06F 11/3409 |
| | | | | 706/12 |
| 2014/0108659 | A1 | 4/2014 | Saito | |
| 2018/0128863 | A1* | 5/2018 | Utsumi | G06Q 50/06 |

OTHER PUBLICATIONS

Zhuang et al., A Reasonable Approach for Defining Load Index in Parallel Computing, 2008 IEEE/IFIP International Conference on Embedded and Ubiquitous Computing, pp. 467-473. (Year: 2008).*

H. Sawada, "Nonnegative Matrix Factorization and Its Applications to Data/Signal Analysis", The journal of the Institute of Electronics, Information and Communication Engineers, vol. 95 No. 9, pp. 829-833, Sep. 1, 2012.

P. O. Hoyer, "Non-negative Matrix Factorization with Sparseness Constraints", Journal of Machine Learning Research, vol. 5, pp. 1457-1469, 2004.

H. Kameoka, "Non-negative Matrix Factorization and Its Variants with Applications to Audio Signal Processing", Journal of the Japan Statistical Society, vol. 44, No. 2, pp. 383-407, 2015.

"Lessons for High-reliability of Information Processing System (IT service)", Information-technology Promotion Agency, Japan(IPA), Software Reliability Enhancement Center, pp. 1-270, 2017.

* cited by examiner

FIG. 7

COMPONENT 700

| COMPONENT 1 | COMPONENT 2 | ... |
|---|---|---|
| 0 | 0 | |
| 0 | 0 | |
| 0 | 0 | |
| 0 | 0 | |
| 0 | 0 | |
| 0 | 0 | |
| 0 | 0 | |
| 0 | 0 | |
| 1 | 0 | |
| 1 | 0 | |
| 1 | 0 | |
| ... | ... | |

FIG. 10

LONG-TERM TENDENCY OF COMPONENT    1000

| COMPONENT ID | INCREASING/ DECREASING | REGRESSION EQUATION |
|---|---|---|
| 1 | INCREASING | y = 0.0033x − 143.37 |
| 2 | FLAT | y = 0.399 |
| 3 | FLAT | y = 0.401 |
| ... | | |

FIG. 16

| OPERATION DATA | | | | |
|---|---|---|---|---|
| SERVER NAME | DATE/TIME | CPU USAGE RATE [%] | DISK IO [IOPS] | |
| AP01 | 20180101 00:00 | 10 | 2 | ⇐ DAILY OPERATION DATA OF 20180101 |
| AP01 | 20180101 01:00 | 11 | 3 | |
| AP01 | ... | ... | ... | |
| DB01 | 20180101 00:00 | 1 | 10 | |
| DB01 | 20180101 01:00 | 4 | 8 | |
| DB01 | ... | ... | ... | |
| AP01 | 20180102 00:00 | 14 | 5 | ⇐ DAILY OPERATION DATA OF 20180102 |
| AP01 | 20180102 01:00 | 12 | 7 | |
| AP01 | ... | ... | ... | |
| DB01 | 20180102 00:00 | 2 | 9 | |
| DB01 | 20180102 01:00 | 3 | 4 | |
| DB01 | ... | ... | ... | |

DAILY OPERATION DATA (20180101) ~500

| SERVER NAME | DATE/TIME | CPU USAGE RATE [%] | DISK IO [IOPS] |
|---|---|---|---|
| AP01 | 20180101 00:00 | 10 | 2 |
| AP01 | 20180101 01:00 | 11 | 3 |
| AP01 | ... | ... | ... |
| DB01 | 20180101 00:00 | 1 | 10 |
| DB01 | 20180101 01:00 | 4 | 8 |
| DB01 | ... | ... | ... |

DAILY OPERATION DATA (20180102) ~500

| SERVER NAME | DATE/TIME | CPU USAGE RATE [%] | DISK IO [IOPS] |
|---|---|---|---|
| AP01 | 20180102 00:00 | 14 | 5 |
| AP01 | 20180102 01:00 | 12 | 7 |
| AP01 | ... | ... | ... |
| DB01 | 20180102 00:00 | 2 | 9 |
| DB01 | 20180102 01:00 | 3 | 4 |
| DB01 | ... | ... | ... |

OPERATION DATA (VECTOR) ~600

| 1ST DAY DATA | 2ND DAY DATA |
|---|---|
| 10 | 14 |
| 11 | 12 |
| ... | ... |
| 2 | 5 |
| 3 | 7 |
| ... | ... |
| 1 | 2 |
| 4 | 3 |
| ... | ... |
| 10 | 9 |
| 8 | 4 |
| ... | ... |
| → $x_1$ | → $x_2$ |

96 DIMENSIONS (= NUMBER OF SERVERS; 2 × NUMBER OF RESOURCES; 2 × NUMBER OF TIMES OF SAMPLING PER DAY; 24)

FIG. 19

| COMPONENT | | | |
|---|---|---|---|
| COMPONENT 1 | COMPONENT 2 | ... | |
| 0 | 0 | | |
| 0 | 0 | | |
| 0 | 0 | | |
| 0 | 0 | | |
| 0 | 0 | | |
| 0 | 0 | | |
| 0 | 0 | | |
| 0 | 0 | | |
| 1 | 0 | | |
| 1 | 0 | | |
| 1 | 0 | | |
| ... | ... | | |

700

96 DIMENSIONS
(= NUMBER OF SERVERS; 2
× NUMBER OF RESOURCES; 2
× NUMBER OF TIMES OF
SAMPLING PER DAY; 24)

WEIGHT COEFFICIENT FOR COMPONENT

| COMPONENT ID | DATE | WEIGHT COEFFICIENT |
|---|---|---|
| 1 | 20180101 | 0.3 |
| 1 | 20180102 | 0.303 |
| 1 | ... | |
| 2 | 20180101 | 0 |
| 2 | 20180102 | 0 |
| 2 | ... | |
| ... | | |

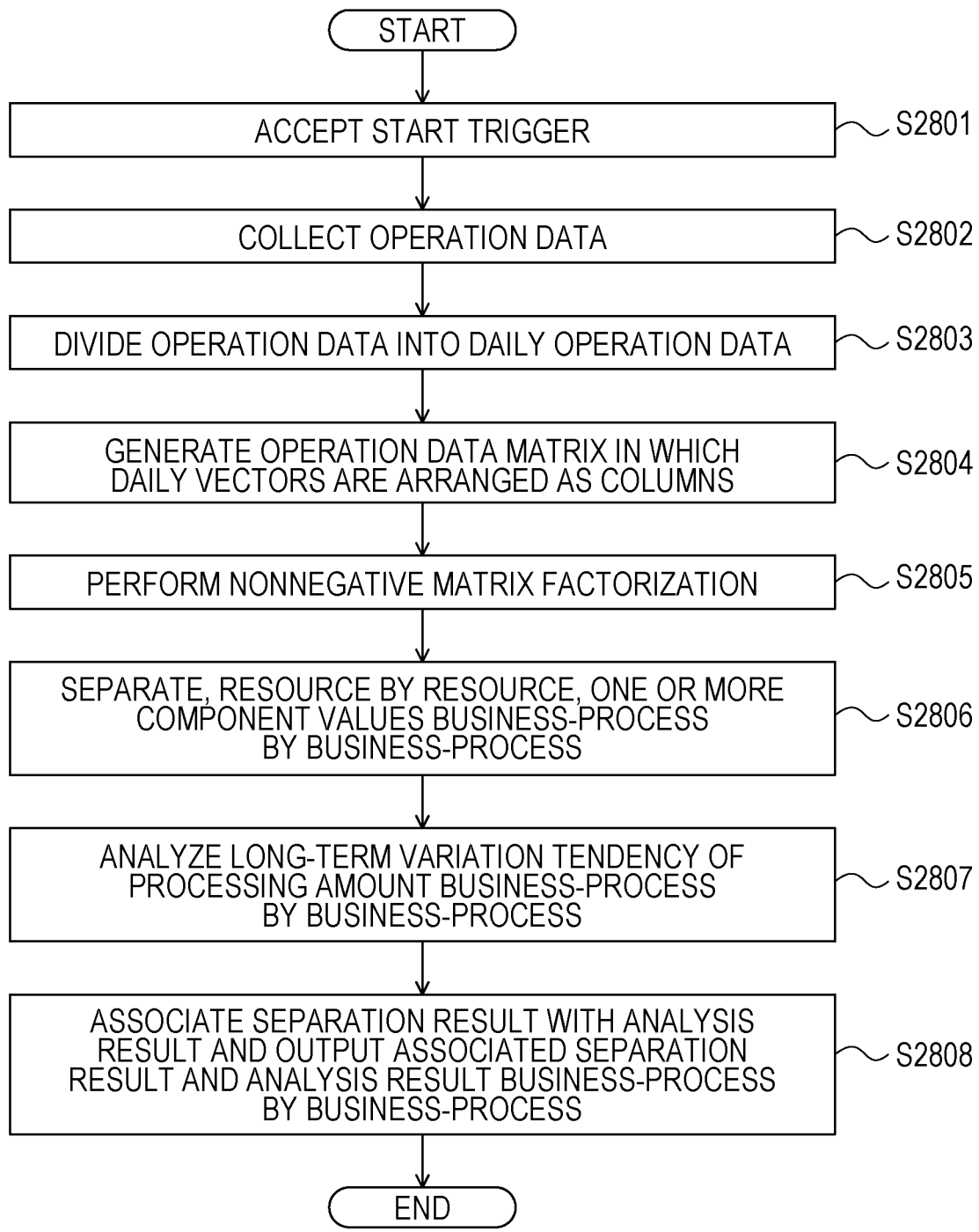

ANALYSIS OF TIME-SERIES DATA INDICATING TEMPORAL VARIATION IN USAGE STATES OF RESOURCES USED BY MULTIPLE PROCESSES

CROSS-REFERENCE TO RELATED APPLICATION

This application is based upon and claims the benefit of priority of the prior Japanese Patent Application No. 2018-189356, filed on Oct. 4, 2018, the entire contents of which are incorporated herein by reference.

FIELD

The embodiment discussed herein relates to analysis of time-series data indicating temporal variation in usage states of resources used by multiple processes.

BACKGROUND

Nowadays, there are techniques to acquire and analyze time-series data that indicates temporal variation of an index indicating a usage state of a resource of a device. Examples of the index include, for example, the CPU usage rate, the memory usage rate, and so forth. Furthermore, it is desirable, in some cases, to analyze the time-series data that indicates the temporal variation of the index indicating the usage state of the resource of the device business-process by business-process. Here, the business processes are performed by using the devices.

For example, with a related-art technique, an arrangement configuration is derived by calculating a solution to an optimization problem that minimizes, as an object function, a total amount of physical resources of the whole of a plurality of physical machines to which virtual machines are allocated. Also, for example, there exists a technique with which whether there is a correlation between variation directions of loads is determined by coding the variation directions of the loads of a plurality of jobs, calculating the coded product, and performing a chi-square test on the coded product.

Japanese Laid-open Patent Publication Nos. 2012-159928 and 2014-78160 are examples of related art.

SUMMARY

According to an aspect of the embodiments, time-series data indicating a temporal variation of an index is acquired where the index indicates a usage state of each of one or more resources that are used by multiple processes. An operation-data matrix including vectors as columns or rows is generated, based on the acquired time-series data, such that each of the vectors indicates the time-series data at a predetermined time interval and includes as an element the index indicating the usage state of one of the one or more resources at the predetermined time interval. A basis matrix including a predetermined number of basis vectors as columns or rows is generated by performing nonnegative matrix factorization on the generated operation-data matrix. One or more component values indicated by each of the predetermined number of the basis vectors included in the generated basis matrix are extracted, where the extracted one or more components values correspond to the one or more resources, respectively, and information on the extracted one or more component values is output as usage states of the one or more resources that are used by each of the multiple processes.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is an explanatory diagram illustrating an example of the data structure of a component table;

FIG. 10 is an explanatory diagram illustrating an example of the data structure of a long-term tendency table;

FIG. 16 is an explanatory diagram (No. 2) illustrating the example of the operation of the information processing device;

FIG. 17 is an explanatory diagram (No. 3) illustrating the example of the operation of the information processing device;

FIG. 19 is an explanatory diagram (No. 5) illustrating the example of the operation of the information processing device;

FIG. 28 is a flowchart illustrating an example of a procedure of entire processing.

DESCRIPTION OF EMBODIMENTS

With the related-art technique, in some cases, it is difficult to analyze the time-series data that indicates the temporal variation of the index indicating the usage state of the resource of the device business-process by business-process. For example, when a plurality of business processes are performed by using a single device, pieces of data corresponding to respective business processes are integrated in the time-series data that indicates the temporal variation of the index indicating the usage state of the resource of the single device. Thus, a business-process by business-process analysis is not able to be performed on the time-series data.

It is desirable to output information about resources business-process by business-process.

Hereinafter, an output program and a method of outputting according to an embodiment are described in detail with reference to the drawings.

(Example of a Method of Outputting According to the Embodiment)

Figure 1:
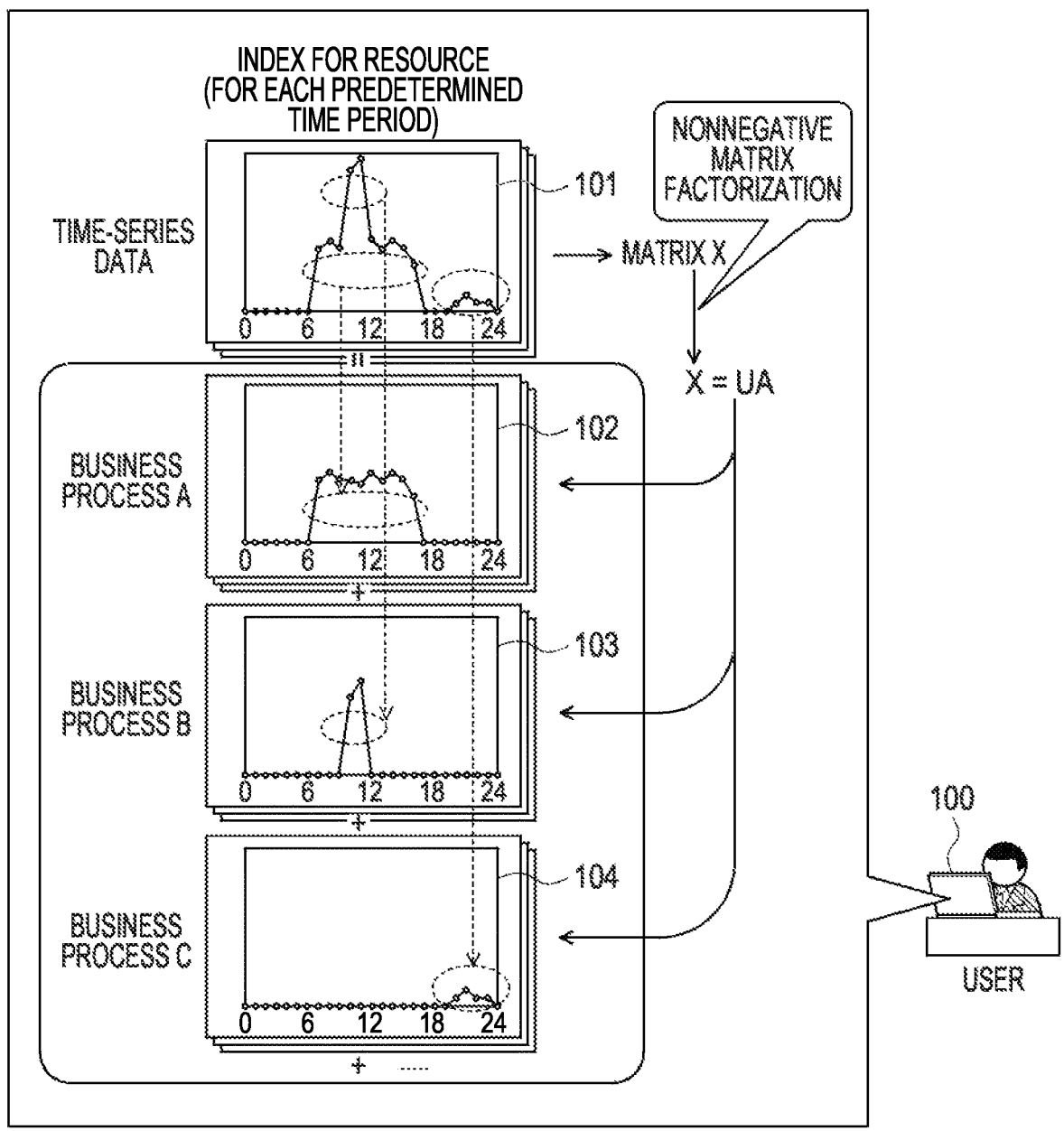
FIG. 1 is an explanatory diagram illustrating an example of a method of outputting according to an embodiment.

FIG. 1 is an explanatory diagram illustrating an example of a method of outputting according to the embodiment. An information processing device 100 is a computer that is able to output, for each of the business processes performed by using one or more devices included in a business processing system, information about resources of each of the devices.

Here, the business processing system is, for example, an information and communication technology (ICT) system. The devices are, for example, ICT devices. The devices are, for example, servers. The resources are, for example, central processing units (CPUs), memory, communication bandwidths, and so forth. Each of the business processes is, for example, a series of types of processing realized by performing one or more processes in the one or more devices.

Here, in the related-art ICT system, it is desirable, in some cases, to analyze time-series data indicating temporal variation of indexes indicating a usage state of the resources of the one or more devices for each of business-processes (business-process by business-process). Here, the business processes are performed by using the devices. For example, it may be desirable, business-process by business-process, to analyze time-series data, understand variation tendencies of loads applied to the resources of the device, or predict the loads applied in future to the resources of the devices. However, it may be difficult to analyze the time-series data business-process by business-process.

For example, in some cases, a plurality of business processes are performed by using a single device. For example, there may be a case where a process for accepting a query from a plurality of the business processes to a database is performed by a single device. In this case, pieces of data corresponding to the respective business processes are integrated in the time-series data that indicates the temporal variation of the indexes indicating usage states of the resources of the single device. Thus, a business-process by business-process analysis is not able to be performed on the time-series data. Even when the time-series data indicating the temporal variation of the indexes indicating the usage states of the resources is able to be acquired process by process, similarly, the time-series data is not able to be analyzed for each of business-processes.

In contrast, for example, there may be a case where component decomposition is performed on the time-series data for each of the resources of each of the devices. For example, it may be attempted that the time-series data is analyzed for each of business-processes by decomposing, through component decomposition, the time-series data for each of the resources of each of the devices into one or more pieces of component data that are elements of the time-series data for each of the resources of each of the devices. However, even when the decomposed component data is referred to, it may be difficult to analyze the time-series data for each of business-processes.

For example, a combination of pieces of the component data corresponding to a single business process is not able to be identified from one or more pieces of the component data for each of the resources of each of the devices. Thus, a business-process by business-process analysis of the time-series data is not able to be performed. For example, since the time-series data associated with the different resources is divided by different criteria, the relationship of pieces of the component data between the resources is unknown, and the combination of the pieces of the component data of the different resources is not able to be associated with a single business process. For example, when the usage tendencies of the resources in the different business processes are similar to one another, data associated with a plurality of the business processes may be integrated in the component data divided from time-series data associated with the resources.

Accordingly, a method of outputting is described according to the present embodiment. This method of outputting is, by utilizing the characteristics of the business processes in the business processing system, able to allow information about the resources to be output for each of business-processes based on the time-series data for each of the resources of each of the devices of the business processing system.

Here, as the characteristics of the business processes in the business processing system, for example, the following two characteristics are thought. For example, it is thought that there is a first characteristic with which the amount of processing of the business processes tends to periodically vary at predetermined time intervals. Here, the length of each of the predetermined time intervals is a day, a week, a month, or the like. Furthermore, for example, it is thought that there is a second characteristic with which the usage states of one or more resources are determined based on the processing amounts of one or more business processes.

With the above-described characteristics, it is thought that, among the time-series data indicating the temporal variation of the indexes respectively indicating the usage states of the different resources, pieces of the component data corresponding to the same business process become similar to one another in periodical variation tendency at predetermined time intervals. Also, with the above-described characteristics, a load model is considered in which the index indicating the usage state of each of the one or more resources is proportional to the processing amount of each of the one or more business processes. Exemplary content of the load model will be described later with reference to FIGS. 13 and 14.

Thus, when the information processing device 100 utilizes the above-described load model to separate, from the time-series data associated with each of the one or more resources, pieces of the component data having similar periodical variation tendencies at predetermined time intervals, business-process by business-process acquisition of the information about the resource becomes possible.

In the example illustrated in FIG. 1, (1-1) the information processing device 100 acquires the time-series data indicating the temporal variation of the index indicating the usage state of each of the one or more resources. The one or more resources may include, for example, different types of the resources in the same device. The one or more resources may include, for example, the resources in the different devices. The index is, for example, a CPU usage rate, a memory usage rate, a bandwidth usage rate, and so forth.

(1-2) Based on the acquired time-series data, the information processing device 100 generates a matrix X including, as the columns, the vectors at the predetermined time intervals having the elements that are the indexes indicating the usage states of the one or more resources at the predetermined time intervals. The length of each of the predetermined time intervals is, for example, a single day. For example, the information processing device 100 generates the daily vectors having the elements that are the indexes indicating the usage states of the one or more resources per day and generates the matrix X including the daily vectors as the respective columns.

Based on the above-described load model, the matrix X is able to be defined by a product of a basis matrix U including a predetermined number of basis vectors as columns and a weight matrix A including a predetermined number of weight vectors as rows. The basis vectors indicate the component data of the one or more resources having similar periodical variation tendencies at the predetermined time intervals. The component data is, for example, time-series data indicating temporal variation in the component value at the predetermined time intervals. The weight vectors indicate the weights of the business processes at the predetermined time intervals. The weights of the business processes correspond to, for example, the processing amounts of the business processes. In other words, part of data associated with a single resource at a predetermined time interval corresponding to a graph 101 among the acquired time-series data is expressed by a combination of data being the component data for the business processes multiplied by weight coefficients such as component data corresponds to graphs 102 to 104.

(1-3) The information processing device 100 performs nonnegative matrix factorization on the generated matrix X to generate a basis matrix U. For example, the information processing device 100 defines the matrix X by the product of the basis matrix U and the weight matrix A and performs the nonnegative matrix factorization to generate the basis matrix U. For the nonnegative matrix factorization, for example, Reference 1 below may be referred to.

Reference 1: Hoyer, Patrik O, "Non-negative Matrix factorization with sparseness constraints." Journal of machine learning research, 5, 1457-1469, 2004.

(1-4) The information processing device 100 separates the one or more component values indicated by the predetermined number of basis vectors included in the generated basis matrix for each of the one or more resources and outputs the result of the separation. For example, when generating the vectors included in the matrix, the information processing device 100 separates the one or more component values for the one or more resources based on at what positions the indexes indicating the usage states of the one or more resources are set as the elements.

Thus, the information processing device 100 is able to output information about each of the one or more resources for each of business-processes. As a result, the information processing device 100 is able to allow a user to easily analyze the time-series data and a usage tendency of each of the one or more resources at the predetermined time intervals for each of business-processes.

For example, the information processing device 100 is able to summarize the indexes associated with the resources at predetermined time intervals such that these indexes are able to be processed as the respective columns of the matrix. This allows the first characteristic of the business processes to be reflected in a result of the nonnegative matrix factorization. Accordingly, the information processing device 100 is able to allow the extraction of resource-by-resource component data that have similar periodical variation tendencies at the predetermined time intervals, for each of the business processes, through the nonnegative matrix factorization.

Furthermore, the information processing device 100 is able to allow the indexes associated with different resources of the different business processing devices to be integrally processed as respective columns of the matrix. Thus, the information processing device 100 is able to identify and extract from the time-series data associated with one or more resources, through the nonnegative matrix factorization, combinations of pieces of the component data corresponding to the same business process. Furthermore, when the usage tendencies in the plurality of business processes for any of the resources are similar to one another and pieces of the component data corresponding to the respective business processes are similar to one another, the information processing device 100 is able to separate and extract the pieces of the component data corresponding to the respective business processes through the nonnegative matrix factorization.

Although the information processing device 100 does not output information about each of the predetermined number of weight vectors herein, this is not limiting. The information processing device 100 may outputs, for example, each of the predetermined number of weight vectors. Thus, the information processing device 100 is able to provide the user with information that is useful for analyzing long-term variation tendencies of the processing amounts for each of business-processes.

Further, for example, the information processing device 100 may output a result of analyzing the long-term variation tendencies of processing amounts for each of the business-processes, based on the predetermined number of respective weight vectors. In other words, the long-term variation tendencies of the business-process by business-process processing amounts are long-term variation tendencies of loads applied to the one or more resources for each of the business-processes. The term "long term" means a period longer than a predetermined time interval. An example of an analysis of the long-term variation tendencies of the business-process by business-process processing amounts will be described later with reference to FIGS. 12 to 27.

Although the information processing device 100 generates the matrix X including the vectors at predetermined time intervals as the column herein, this is not limiting. For example, the information processing device 100 may generate a matrix X' including the vectors at predetermined time intervals as the rows. In this case, the matrix X' is able to be defined by a product of a weight matrix A' including a predetermined number of weight vectors as columns and a basis matrix U' including a predetermined number of basis vectors as rows.

(Example of a Business Processing System 200)

Figure 2:
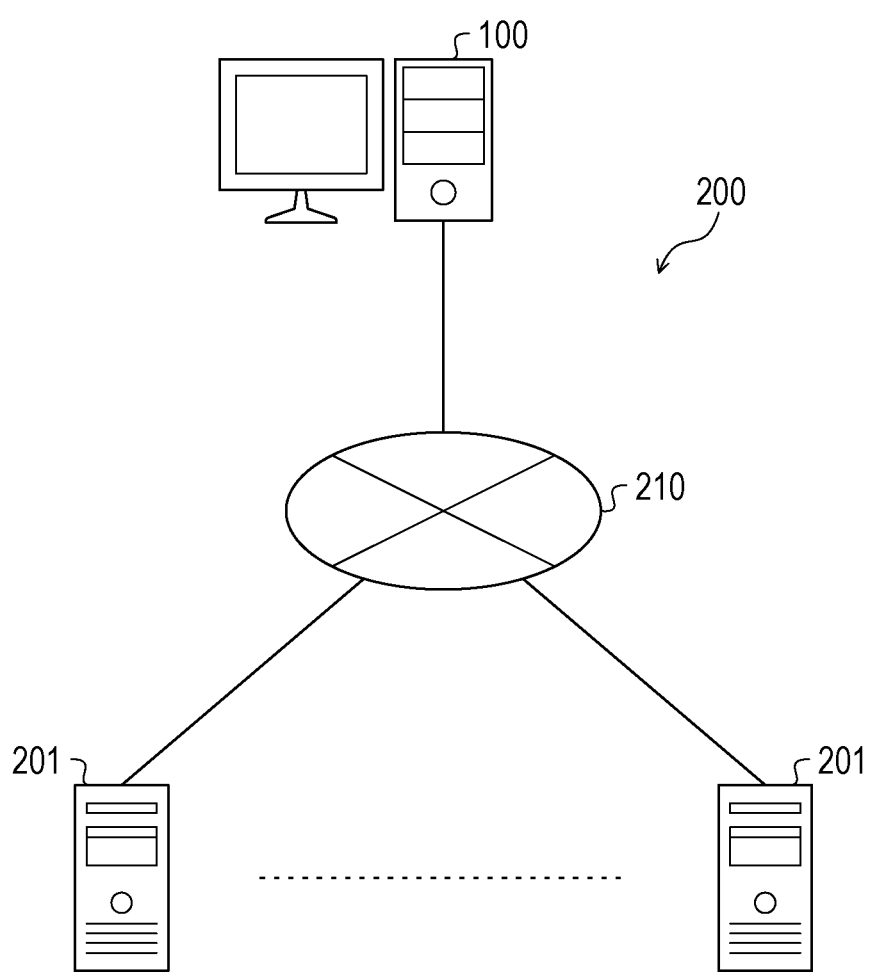
FIG. 2 is an explanatory diagram illustrating an example of a business processing system.

Next, referring to FIG. 2, an example of a business processing system 200 to which the information processing device 100 illustrated in FIG. 1 is applied is described.

FIG. 2 is an explanatory diagram illustrating the example of the business processing system 200. In FIG. 2, the business processing system 200 includes the information processing device 100 and one or more business processing devices 201.

In the business processing system 200, the information processing device 100 and the business processing devices 201 are coupled to one another through a wired or wireless network 210. The network 210 is, for example, a local area network (LAN), a wide area network (WAN), the Internet, or the like.

The information processing device 100 is a computer that outputs information associated with the one or more resources for each of business-processes. The information processing device 100 communicates with, for example, the business processing devices 201 and obtains entire operation data. For example, the information processing device 100 collects indexes representing usage states of the resources included in the business processing devices 201 at predetermined timing and generates entire operation data in which the collected indexes are summarized. The entire operation data is stored, for example, by using an operation table 400, which will be described later with reference to FIG. 4.

For example, the information processing device 100 divides the entire operation data into pieces of the operation data at predetermined time intervals. The length of each of the predetermined time intervals is, for example, a single day. Daily operation data having been divided on a daily basis is stored, for example, by using a daily table 500, which will be described later with reference to FIG. 5. For example, the information processing device 100 vectorizes the daily operation data having been divided on a daily basis and generates daily vectors. The daily vectors are stored, for example, by using a vector table 600, which will be described later with reference to FIG. 6.

The information processing device 100 generates, for example, an operation data matrix including daily vectors in columns. The information processing device 100 performs, for example, nonnegative matrix factorization on the generated operation data matrix based on the basis numbers so as to generate a basis matrix and a weight matrix. The basis matrix is stored by using, for example, a component table 700, which will be described later with reference to FIG. 7. The weight matrix is stored by using, for example, a weight table 800, which will be described later in detail with reference to FIG. 8.

For example, the information processing device 100 separates, for each of resources, one or more business-process by business-process component values included in basis vectors corresponding to the business processes included in the basis matrix. The separated results are stored by using, for example, a separation result table 900, which will be described later with reference to FIG. 9. The information processing device 100 analyzes the long-term variation tendency of a usage state for each of the resources in each of the business processes based on the weight vector corresponding to the business process included in the weight matrix. The analyzed results are stored by using, for example, a long-term tendency table 1000, which will be described later with reference to FIG. 10.

The information processing device 100 associates, for each of business-processes, the result obtained by separating the one or more component values for each of the resources with the analyzed result of the long-term variation tendency of the usage state of the respective resources, and outputs the associated result. The information processing device 100 is, for example, a server, a personal computer (PC), or the like.

Each of the business processing devices 201 is a computer for realizing business processes. The business processing device 201 performs, for example, one of one or more types of processing that realizes the business process. Further, the business processing device 201 has the one or more resources and periodically measures and stores the indexes indicating the usage states of the resources. The business processing device 201 is, for example, a server, a PC, or the like.

Herein, although the business processing system 200 includes a single information processing device 100 according to the above description, it is not limiting. For example, the business processing system 200 may include a plurality of information processing devices 100. Then, the information processing devices 100 may cooperate with one another to realize the processing.

Although the information processing device 100 is a different device from the business processing device 201 according to the above description herein, it is not limiting. For example, the information processing device 100 may be integrated with any one of the business processing devices 201.

(Example of Hardware Configuration of the Information Processing Device 100)

Next, an example of a hardware configuration of the information processing device 100 is described with reference to FIG. 3.

Figure 3:
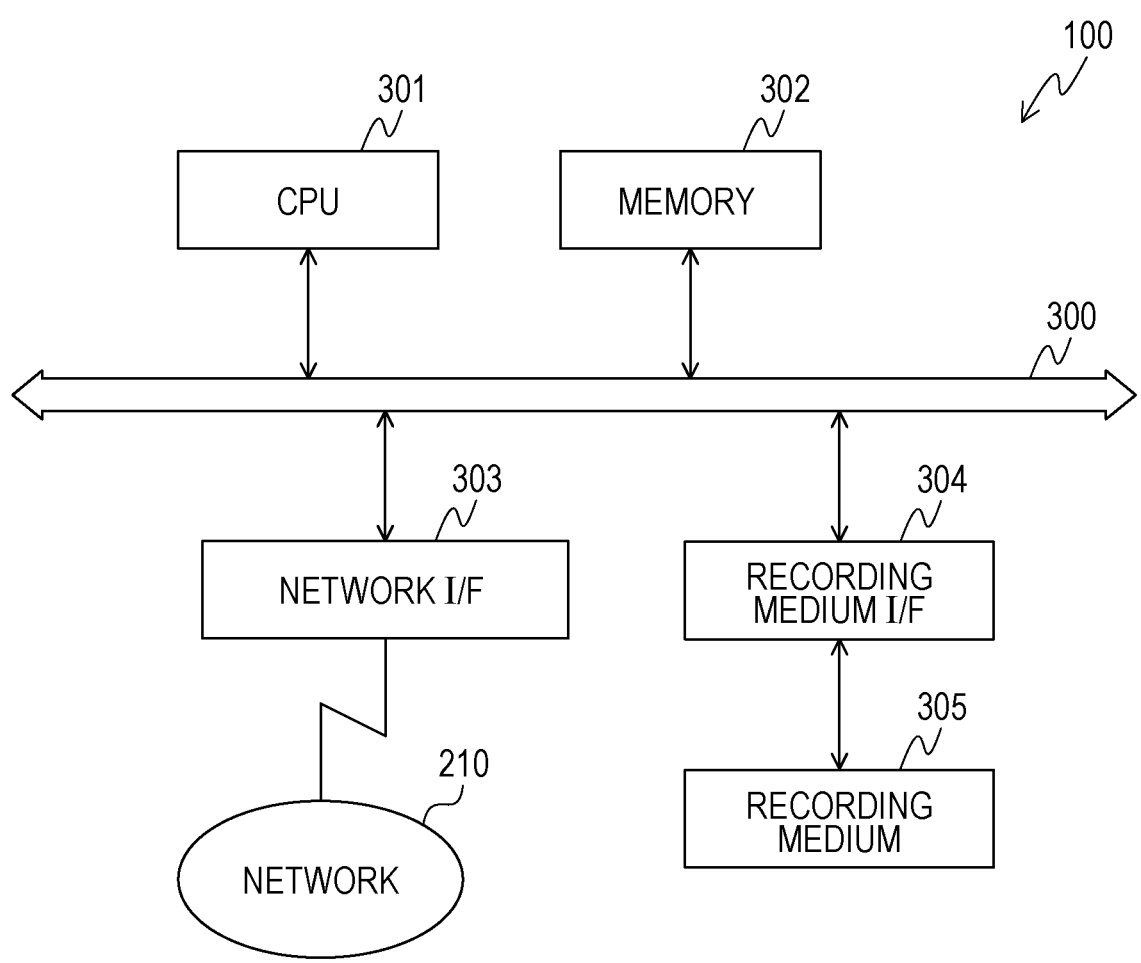
FIG. 3 is a block diagram illustrating an example of a hardware configuration of an information processing device.

FIG. 3 is a block diagram illustrating the example of the hardware configuration of the information processing device 100. Referring to FIG. 3, the information processing device 100 includes a CPU 301, a memory 302, a network interface (I/F) 303, a recording medium I/F 304, and a recording medium 305. These components are coupled to one another through a bus 300.

Here, the CPU 301 controls the entirety of the information processing device 100. The memory 302 includes, for example, a read-only memory (ROM), a random-access memory (RAM), a flash ROM, and the like. For example, the flash ROM and the ROM store various programs, and the RAM is used as a work area of the CPU 301. The program stored in the memory 302 is loaded into the CPU 301, thereby causing the CPU 301 to execute coded processing.

The network I/F 303 is coupled to the network 210 through a communication line and is coupled to another computer via the network 210. The network I/F 303 controls the network 210 and an internal interface so as to control data input/output from/to the other computer. The network I/F 303 is, for example, a modem, a LAN adapter, or the like.

The recording medium I/F 304 controls reading/writing of data from/to the recording medium 305 under the control of the CPU 301. The recording medium I/F 304 is, for example, a disk drive, a solid state drive (SSD), a Universal Serial Bus (USB) port, or the like. The recording medium 305 is a nonvolatile memory that stores the data written under the control of the recording medium I/F 304. The recording medium 305 is, for example, a disk, a semiconductor memory, a USB memory, or the like. The recording medium 305 may be detachable from the information processing device 100.

In addition to the above-described components, the information processing device 100 may include, for example, a keyboard, a mouse, a display, a printer, a scanner, a microphone, a speaker, and the like. The information processing device 100 may include a plurality of the recording medium I/Fs 304 or a plurality of the recording media 305. The information processing device 100 does not necessarily include the recording medium I/F 304 or the recording medium 305.

(Structure of the Operation Table 400)

Next, an example of the structure of the operation table 400 is described with reference to FIG. 4. The operation table 400 is realized by using, for example, a storage area of the memory 302, the recording medium 305, or the like of the information processing device 100 illustrated in FIG. 3.

Figure 4:
FIG. 4 is an explanatory diagram illustrating an example of the structure of an operation table.

FIG. 4 is an explanatory diagram illustrating an example of the structure of the operation table 400. As illustrated in FIG. 4, the operation table 400 has a server name field, a date/time field, and one or more resource fields. Records are stored in the operation table 400 by setting information in the fields.

A server name for identifying the business processing device 201 is set in the server name field. In the date/time field, a combination of the date and time at which the index indicating the usage state of the resource is measured in the business processing device 201 is set. The index indicating a resource usage state is set in the resource field.

For example, the resource fields include a CPU usage rate [%] field, a disk input/output (IO) [IOPS] field, and so forth. The CPU usage rate is set in the CPU usage rate field. The CPU usage rate is an index indicating the usage state of the CPU 301 in the business processing device 201. The disk IO is set in the disk IO field. The disk IO is an index indicating the usage state of the recording medium 305 in the business processing device 201.

(Structure of the Daily Table 500)

Next, an example of the structure of the daily table 500 is described with reference to FIG. 5. The daily table 500 is realized by using, for example, a storage area of the memory 302, the recording medium 305, or the like of the information processing device 100 illustrated in FIG. 3.

Figure 5:
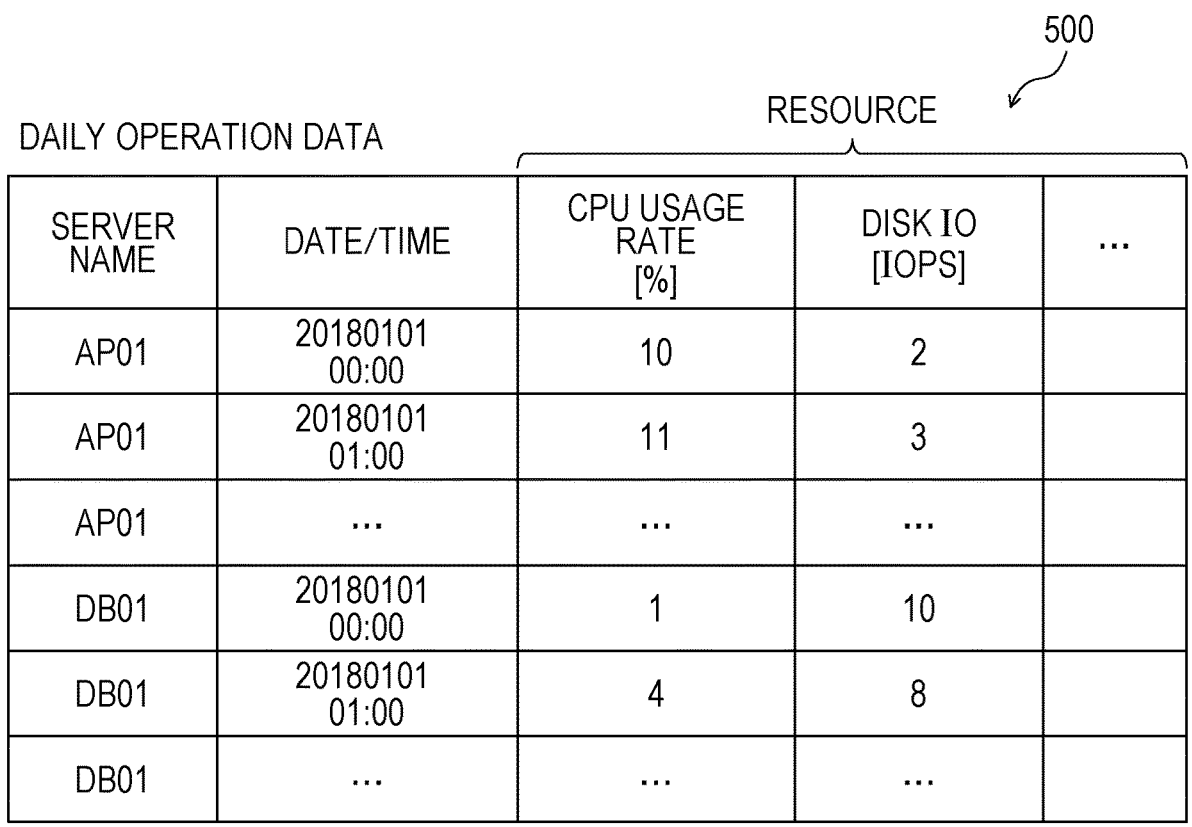
FIG. 5 is an explanatory diagram illustrating an example of the structure of a daily table.

FIG. 5 is an explanatory diagram illustrating an example of the structure of the daily table 500. As illustrated in FIG. 5, the daily table 500 has a server name field, a date/time field, and the one or more resource fields. Records are stored in the daily table 500 by setting information in the fields.

The records in the daily table 500 are records for a single day extracted from the records in the operation table 400 illustrated in FIG. 4. Thus, information similar to or the same as that in the fields of the operation table 400 illustrated in FIG. 4 is set in the fields of the daily table 500. A combination of a date and time of the same day is set in the date/time field of the daily table 500.

(Data Structure of the Vector Table 600)

Next, an example of the data structure of the vector table 600 is described with reference to FIG. 6. The vector table 600 is realized by using, for example, a storage area of the memory 302, the recording medium 305, or the like of the information processing device 100 illustrated in FIG. 3.

Figure 6:
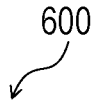
FIG. 6 is an explanatory diagram illustrating an example of the data structure of a vector table.

FIG. 6 is an explanatory diagram illustrating an example of the data structure of the vector table 600. As illustrated in FIG. 6, the vector table 600 has daily operation data field for each day. Records are stored in the vector table 600 by setting information in the fields.

Elements of the vector obtained by vectorizing the daily operation data obtained by dividing the entire operation data on a day-to-day basis are set in the daily operation data fields. The elements of the vector obtained by vectorizing the daily operation data are one or more indexes indicating the usage states of the one or more resources indicated by the daily operation data.

(Data Structure of the Component Table 700)

Next, an example of the data structure of the component table 700 is described with reference to FIG. 7. The component table 700 is realized by using, for example, a storage area of the memory 302, the recording medium 305, or the like of the information processing device 100 illustrated in FIG. 3.

FIG. 7 is an explanatory diagram illustrating an example of the data structure of the component table 700. As illustrated in FIG. 7, the component table 700 has one or more component fields. Records are stored in the component table 700 by setting information in the fields.

Component data for the resources indicated by the basis vectors included in the basis matrix obtained by performing the nonnegative matrix factorization on the operation data matrix is set in the component fields. The component data is a set of component values for the resources. For example, the one or more component values indicated by the basis vectors included in the basis matrix obtained by performing the nonnegative matrix factorization on the operation data matrix are set in the component fields.

(Data Structure of the Weight Table 800)

Next, an example of the data structure of the weight table 800 is described with reference to FIG. 8. The weight table 800 is realized by using, for example, a storage area of the memory 302, the recording medium 305, or the like of the information processing device 100 illustrated in FIG. 3.

Figure 8:
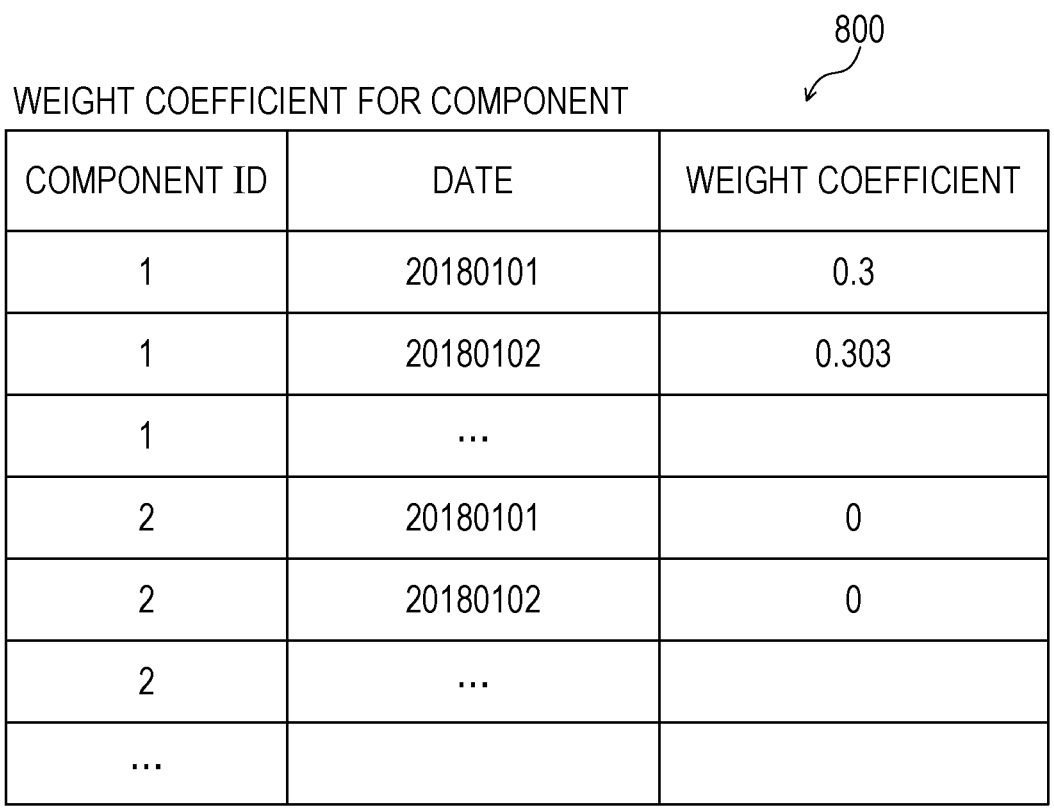
FIG. 8 is an explanatory diagram illustrating an example of the data structure of a weight table.

FIG. 8 is an explanatory diagram illustrating an example of the data structure of the weight table 800. As illustrated in FIG. 8, the weight table 800 has a component ID field, a date field, and a weight coefficient field. Records are stored in the weight table 800 by setting information in the fields.

The component ID for identifying the basis vector indicating the component data for the resource is set in the component ID field. The weight coefficient being an element of the weight vector included in the weight matrix obtained by performing the nonnegative matrix factorization on the operation data matrix is associated with the component ID. The component data is a set of component values for the resources. The component ID is the column number of the component field of the component table 700 in which the resource by resource component data indicated by the basis vector is set. A date to identify the date at which the weight indicated by the weight coefficient, which is an element of the weight vector, corresponds to the amount of processing corresponding to the business process is set in the date field. The weight coefficient, which is an element of the weight vector, is set in the weight coefficient field. The weight coefficient indicates the processing amount of the business process as the weight of the business process.

(Data Structure of the Separation Result Table 900)

Next, an example of the data structure of the separation result table 900 is described with reference to FIG. 9. The separation result table 900 is realized by using, for example, a storage area of the memory 302, the recording medium 305, or the like of the information processing device 100 illustrated in FIG. 3.

Figure 9:
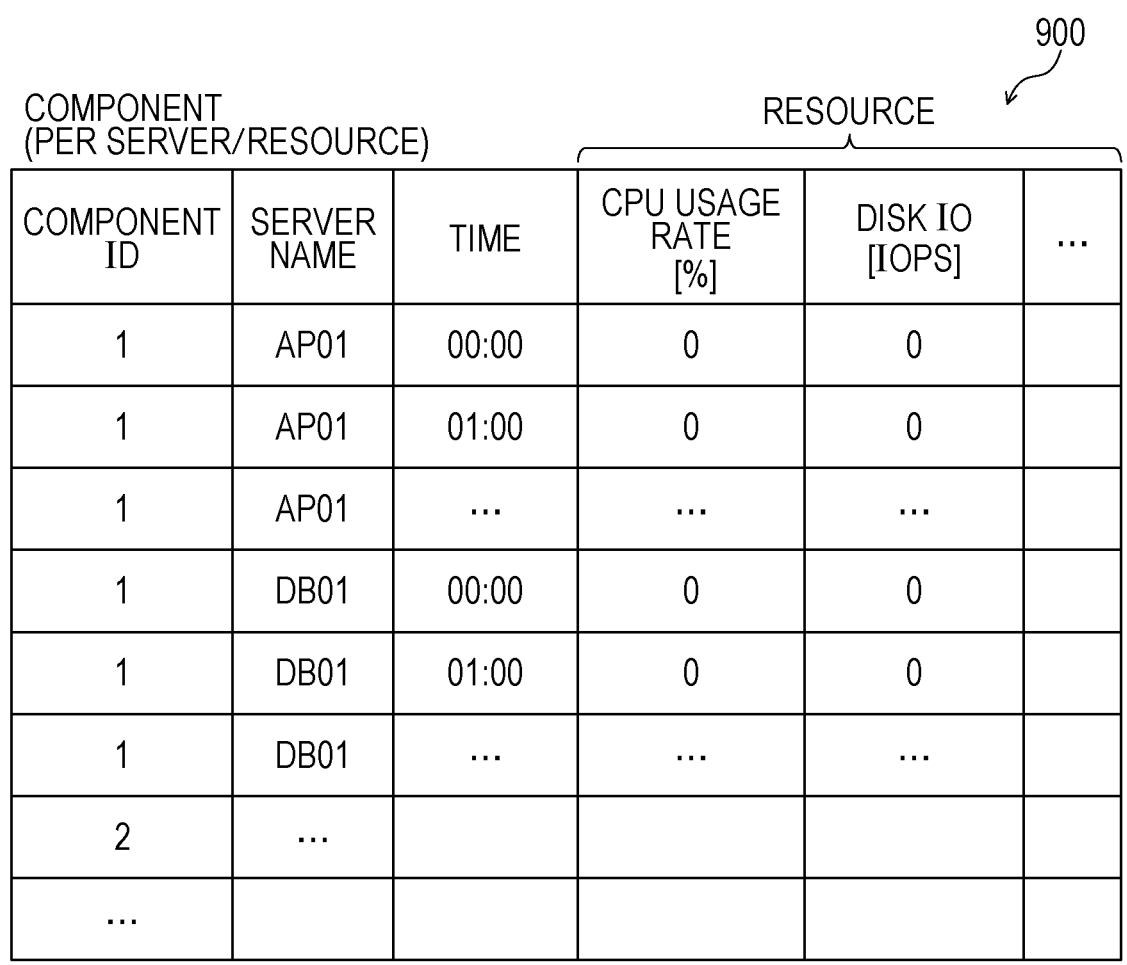
FIG. 9 is an explanatory diagram illustrating an example of the data structure of a separation result table.

FIG. 9 is an explanatory diagram illustrating an example of the data structure of the separation result table 900. As illustrated in FIG. 9, the separation result table 900 has a component ID field, a server name field, a time field, and the one or more resource fields. Records are stored in the separation result table 900 by setting information in the fields.

The component ID is set in the component ID field. The component ID identifies the basis vector, which includes the resource by resource component data and which is a separation source of the resource by resource component data. The component data is a set of component values for the resources. A server name indicating the business processing device 201 with which the component values separated from the set of component values indicated by the basis vector are associated are set in the server name field. A time indicating when the component values separated from the set of the component values indicated by the basis vector are measured by the business processing device 201 is set in the field of time. The component values separated from the set of component values indicated by the basis vector and indicating the usage states of the corresponding resources are set in the resource fields.

For example, the resource fields include a CPU usage rate field, a disk IO field, and so forth. The CPU usage rate is set in the CPU usage rate field. The CPU usage rate is a component value indicating the usage state of the CPU 301 in the business processing device 201. The disk IO is set in the disk IO field. The disk IO is a component value indicating the usage state of the recording medium 305 in the business processing device 201.

(Data Structure of the Long-Term Tendency Table 1000)

Next, an example of the data structure of the long-term tendency table 1000 is described with reference to FIG. 10. The long-term tendency table 1000 is realized by using, for example, a storage area of the memory 302, the recording medium 305, or the like of the information processing device 100 illustrated in FIG. 3.

FIG. 10 is an explanatory diagram illustrating an example of the data structure of the long-term tendency table 1000. As illustrated in FIG. 10, the long-term tendency table 1000 has a component ID field, an increase/decrease tendency field, and a regression equation field. Records are stored in the long-term tendency table 1000 by setting information in the fields.

The component ID for identifying the basis vector indicating the component data for the resource is set in the component ID field. The weight coefficient being an element of the weight vector included in the weight matrix obtained by performing the nonnegative matrix factorization on the operation data matrix is associated with the component ID. The component ID is the column number of the component field of the component table 700 in which the component data for the corresponding resource indicated by the basis vector is set. An increase/decrease tendency, with the passage of time, of the weight coefficient included in the weight vector and analyzed based on the weight vector is set in the increase/decrease tendency field. A regression equation obtained by mathematization of the tendency of changes, over time, of the weight coefficient included in the weight vector is set in the regression equation field.

(Example of Hardware Configuration of the Business Processing Device 201)

An example of the hardware configuration of the business processing device 201 is similar to or the same as that of the information processing device 100 illustrated in FIG. 3. Thus, description of the example of the hardware configuration of the business processing device 201 is omitted. The business processing device 201 stores its own operation data in a data structure similar to or the same as that of the operation table 400 illustrated in FIG. 4. The business processing device 201 does not necessarily store the various tables illustrated in FIGS. 4 to 10.

(Example of Functional Configuration of the Information Processing Device 100)

Next, an example of a functional configuration of the information processing device 100 is described with reference to FIG. 11.

Figure 11:
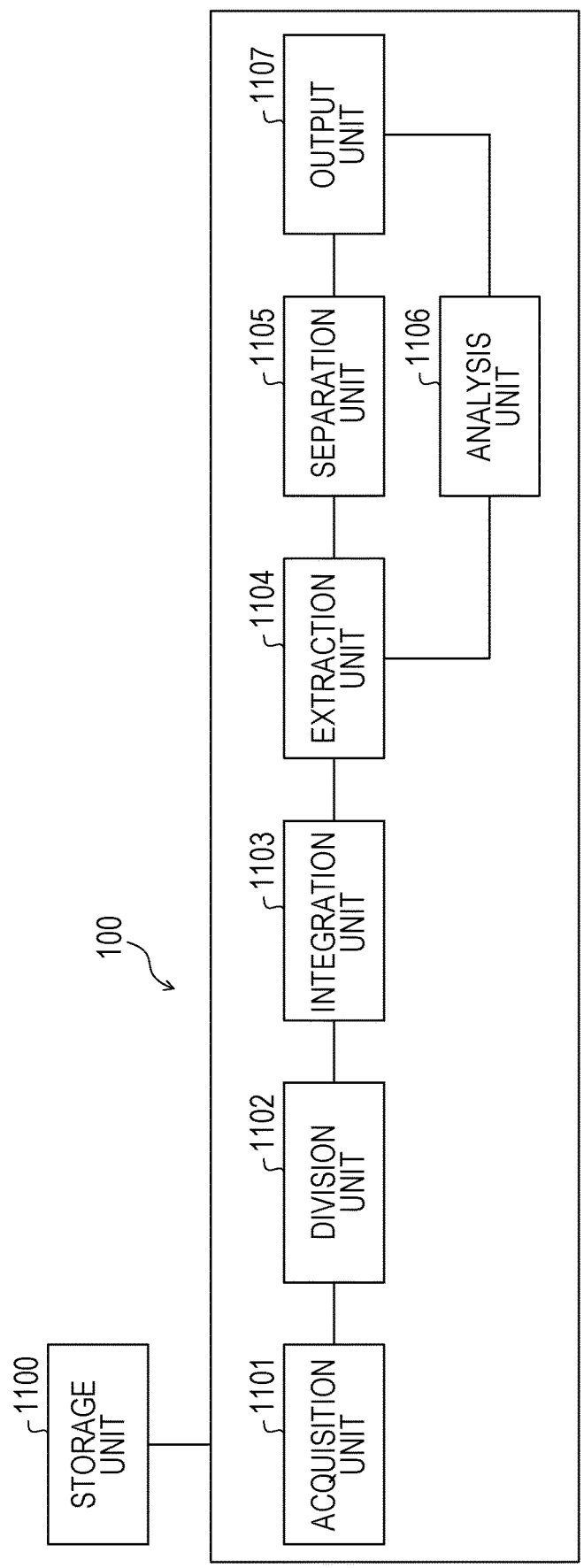
FIG. 11 is a block diagram illustrating an example of a functional configuration of the information processing device.

FIG. 11 is a block diagram illustrating the example of the functional configuration of the information processing device 100. The information processing device 100 includes a storage unit 1100, an acquisition unit 1101, a division unit 1102, an integration unit 1103, an extraction unit 1104, a separation unit 1105, an analysis unit 1106, and an output unit 1107.

The storage unit 1100 is realized by using, for example, a storage area of the memory 302, the recording medium 305, or the like illustrated in FIG. 3. Although the storage unit 1100 is included in the information processing device 100 in the following description, it is not limiting. For example, the storage unit 1100 may be included in a different device from the information processing device 100. In this case, the information processing device 100 is able to refer to the stored content of the storage unit 1100.

The units of the information processing device 100 from the acquisition unit 1101 to the output unit 1107 function as an example of a control unit. For example, the functions of the units from the acquisition unit 1101 to the output unit 1107 are realized by, for example, causing the CPU 301 to execute a program stored in a storage area of the memory 302, the storage medium 305, or the like illustrated in FIG. 3, or by using the network I/F 303. Results of processing performed by the functional units are stored, for example, in a storage area of the memory 302, the recording medium 305, or the like illustrated in FIG. 3.

The storage unit 1100 stores a variety of pieces of information to be referred to or updated in the processing of the functional units. For example, the storage unit 1100 stores time-series data indicating temporal variation in indexes indicating the usage states of the one or more resources. Examples of the resources include, for example, CPUs, memory, and so forth. The one or more resources include, for example, different types of resources in the same device. The one or more resources may be, for example, resources in different devices. The time-series data is included in, for example, the operation data. The storage unit 1100 stores, for example, a matrix to be subjected to the nonnegative matrix factorization. The matrix is generated based on, for example, the time-series data.

The storage unit 1100 stores, for example, the basis matrix and the weight matrix obtained as a result of the nonnegative matrix factorization. The basis matrix includes a predetermined number of basis vectors as columns or rows. The basis vectors indicate component data for the one or more resources having similar periodical variation tendencies at the predetermined time intervals. The component data is, for example, time-series data indicating temporal variation in component value at the predetermined time intervals. The weight matrix includes a predetermined number of weight vectors as columns or rows. The weight vectors indicate the weight of the business processes at the predetermined time intervals. The weight of the business process corresponds to, for example, the processing amount of the business process. For example, the storage unit 1100 stores the various tables illustrated in FIGS. 4 to 10.

The storage unit 1100 stores, for example, a predetermined number. The predetermined number is the number of bases. The number of bases determines the number of basis vectors included in the basis matrix. The predetermined number is set based on the number of business processes performed by using at least one of the one or more resources. The predetermined number is set to, for example, the same number as the number of business processes by the user. The predetermined number may be set based on the number of dimensions of the vectors. For example, the predetermined number is automatically set to the number equal to the number of the dimensions of the vectors.

For example, the storage unit 1100 stores predetermined rules for vectorizing the time-series data indicating temporal variation of the indexes indicating the usage states of the one or more resources at predetermined time intervals. The length of each of the predetermined time intervals is, for example, a day, a week, a month, or the like. The predetermined rules define, in accordance with the types of the resources and the time, the positions of elements in the vector corresponding to the index indicating usage states.

The acquisition unit 1101 acquires various types of information used in the processes of the functional units. The acquisition unit 1101 stores the acquired various types of information in the storage unit 1100 or outputs the acquired pieces of information to the functional units. Furthermore, the acquisition unit 1101 may output various types of information stored in the storage unit 1100 to the functional units. For example, the acquisition unit 1101 acquires various types of information based on an operational input by the user. For example, the acquisition unit 1101 may receive various types of information from a device different from the information processing device 100.

For example, the acquisition unit 1101 acquires time-series data indicating temporal variation in index indicating the usage states of the one or more resources. For example, the acquisition unit 1101 collects the operation data indicating temporal variation in index indicating the usage states of the one or more resources for the business processing devices 201 for a predetermined period of time from the one or more business processing devices 201 and summarizes the collected data, thereby acquiring the entire operation data.

The acquisition unit 1101 may acquire, for example, time-series data indicating temporal variation in index indicating the usage states of the one or more resources at the predetermined time intervals. In this case, for example, the acquisition unit 1101 collects, on each day, operation data indicating temporal variation of the indexes indicating the usage states of the one or more resources for the business processing devices 201 on a daily basis from the one or more business processing devices 201 and summarizes the collected operation data, thereby acquiring the daily operation data. In this case, the information processing device 100 does not necessarily include the division unit 1102. Furthermore, for example, the acquisition unit 1101 may accept the predetermined number in accordance with an operational input by the user.

The division unit 1102 divides the acquired time-series data into pieces of the time-series data at predetermined time intervals. The division unit 1102 divides the acquired operation data, for example, into daily pieces of operation data and acquires the daily operation data. Thus, the division unit 1102 is able to process the acquired time-series data to allow the performing of the nonnegative matrix factorization utilizing the periodical variation tendencies in processing amounts of the business processes.

Based on the acquired time-series data, the integration unit 1103 generates vectors at the predetermined time intervals having the elements that are the indexes indicating the usage states of the one or more resources at the predetermined time intervals. The integration unit 1103 generates, for example, the vectors at the predetermined time intervals including the one or more indexes indicated by the divided time-series data at the predetermined time intervals as the elements. For example, in accordance with the predetermined rules, the integration unit 1103 arranges each of the one or more indexes indicated by the daily operation data as an element of a predetermined position, thereby vectorizing the daily operation data and generating a daily vector. This allows the integration unit 1103 to generate a vector which is a column or a row of the matrix.

The extraction unit 1104 generates a matrix including the vectors at the predetermined time intervals as columns or rows. The extraction unit 1104 generates, for example, an operation data matrix including daily vectors in columns. Thus, the extraction unit 1104 is able to summarize the indexes associated with the resources at predetermined time intervals such that these indexes are able to be processed as the respective columns or rows of the matrix. This allows the characteristics of the business processes to be reflected in a result of the nonnegative matrix factorization. Accordingly, the extraction unit 1104 allows the extraction of, resource by resource, the component data the periodical variation tendencies of which at the predetermined time intervals are similar to one another and which corresponds to the component data for the resources business-process by business-process through the nonnegative matrix factorization.

Furthermore, the extraction unit 1104 is able to allow the indexes associated with different resources of the different business processing devices 201 to be integrally processed as respective columns or rows of the matrix. Thus, the extraction unit 1104 allows the extraction, through the nonnegative matrix factorization, from the time-series data associated with the plurality of resources in such a form that combinations of the component data corresponding to the same business process are identifiable. Furthermore, when the usage tendencies in the plurality of business processes for any of the resources are similar to one another, the extraction unit 1104 allows the extraction of the component data corresponding to the respective business processes in a separable form through the nonnegative matrix factorization.

Next, the extraction unit 1104 performs the nonnegative matrix factorization on the generated matrix. For example, the extraction unit 1104 defines the operation data matrix with the product of the basis matrix and the weight matrix to perform the nonnegative matrix factorization. The extraction unit 1104 generates the basis matrix as a result of the nonnegative matrix factorization. Thus, the extraction unit 1104 is able to extract, resource by resource, as the basis vector, the component data having similar periodical variation tendencies and corresponding to the resource by resource component data business-process by business-process. Further, as a result of the nonnegative matrix factorization, the extraction unit 1104 generates the weight matrix that, when multiplied by the basis matrix, indicates the generated matrix. Thus, the extraction unit 1104 is able to generate information that is useful for analyzing the long-term variation tendencies of the processing amounts business-process by business-process.

The separation unit 1105 separates, for each of the one or more resources, the one or more component values indicated by the predetermined number of basis vectors included in the generated basis matrix. For example, there exists the relationships between the positions of the elements between the basis vectors included in the basis matrix and the positions of the vectors included in the operation data matrix. Accordingly, the separation unit 1105 refers to, for example, the predetermined rules, and separates the one or more component values indicated by the basis vectors for each of the one or more resources. Thus, the separation unit 1105 is able to perform resource by resource acquisition of the component data business-process by business-process.

The analysis unit 1106 generates information about each of the predetermined number of weight vectors included in the generated weight matrix. For example, the analysis unit 1106 generates information indicating the increase/decrease tendency, with the passage of time, of the weight coefficient included in the weight vectors based on the weight vectors. Thus, the analysis unit 1106 is able to analyze the long-term variation tendencies business-process by business-process. Alternatively, the information processing device 100 may allow the user to refer to the weight vectors as they are without analyzing the long-term variation tendencies business-process by business-process. In this case, the information processing device 100 does not necessarily include the analysis unit 1106.

The output unit 1107 outputs the processing result of any one of the functional units. Examples of the output format include, for example, display on a display, printing output to a printer, transmission to an external device by a network I/F 303, and storing in a storage area such as the memory 302 or the recording medium 305. Thus, the output unit 1107 allows the user to be notified of the processing result of each of the functional units. This may improve convenience when using the information processing device 100.

The output unit 1107 outputs, for example, the results of the separation of the one or more component values indicated by the predetermined number of basis vectors for the one or more resources, respectively. Thus, the output unit 1107 is able to allow the user to refer to the component data for each of the resources business-process by business-process. The output unit 1107 may allow the user to easily analyze the time-series data and a usage tendency of each of the one or more resources at the predetermined time intervals business-process by business-process.

The output unit 1107 outputs, for example, information about each of the predetermined number of weight vectors. For example, the output unit 1107 outputs, for each of the weight vectors, information indicating the increase/decrease tendency, with the passage of time, of the weight coefficient included in the weight vector by associating the information indicating the increase/decrease tendency with the component data indicated by the basis vector corresponding to the weight vector. Thus, the analysis unit 1106 is able to allow the user to refer to the long-term variation tendency of the processing amount business-process by business-process.

The output unit 1107 may outputs, for example, each of the predetermined number of weight vectors. Thus, the output unit 1107 is able to provide the user with information that is useful for analyzing the long-term variation tendencies of the processing amounts business-process by business-process.

(Example of the Information Processing Device 100)

Next, an example of the information processing device 100 is described with reference to FIGS. 12 to 20. First, the flow of operations of the information processing device 100 according to the example is described with reference to FIG. 12.

Figure 12:
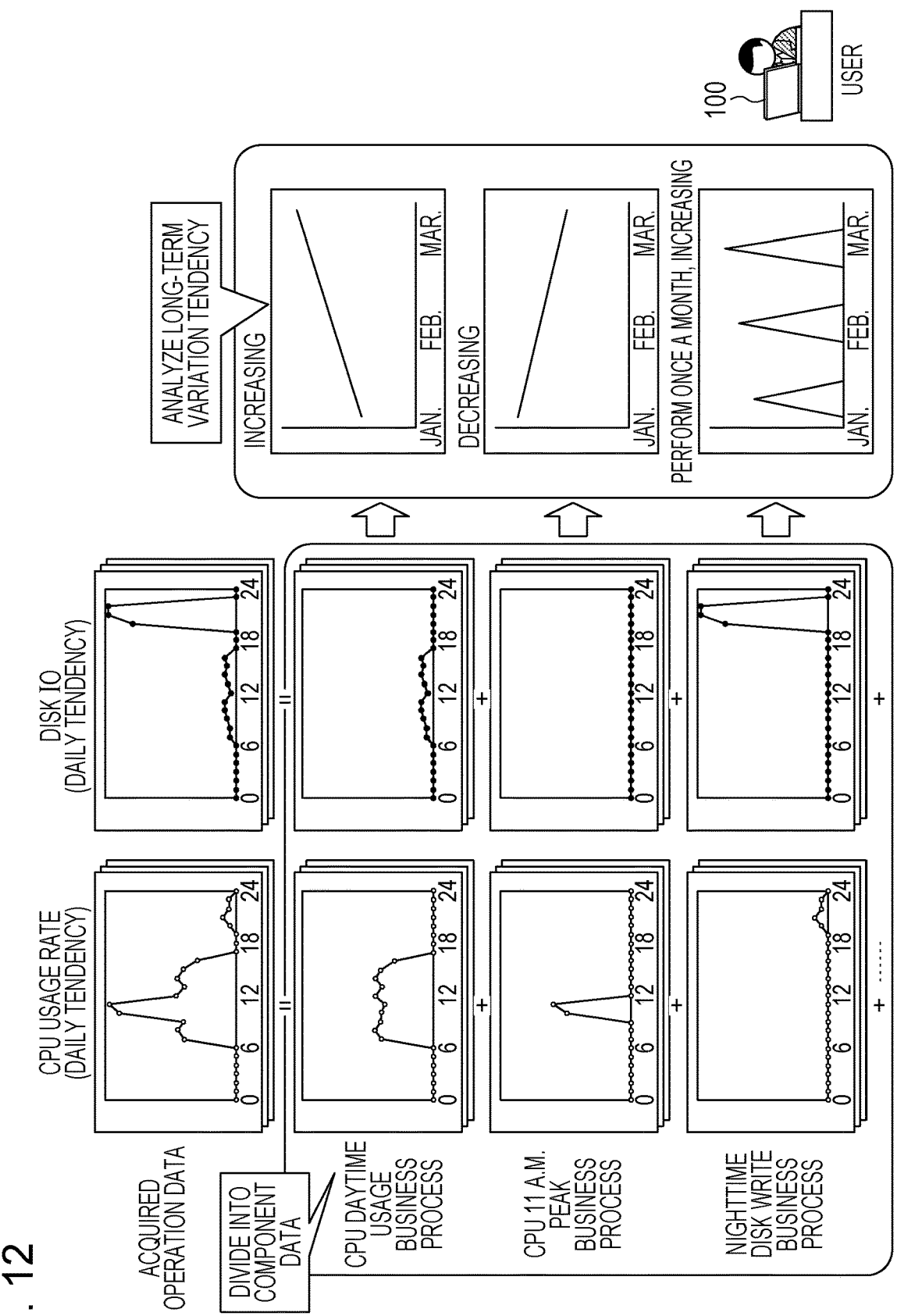
FIG. 12 is an explanatory diagram illustrating the flow of operations of the information processing device.

FIG. 12 is an explanatory diagram illustrating the flow of the operations of the information processing device 100. Referring to FIG. 12, the information processing device 100 acquires the operation data indicating the temporal variation of the CPU usage rate and the disk IO from the business processing device 201. The information processing device 100 generates the operation data matrix from the operation data and performs the nonnegative matrix factorization. The information processing device 100 generates the basis matrix and the weight matrix as a result of performing the nonnegative matrix factorization. The information processing device 100 separates from the basis matrix the business-process by business-process component data resource by resource. Furthermore, based on the weight matrix, the information processing device 100 analyzes the long-term variation tendencies in processing amount business-process by business-process. Then, the information processing device 100 outputs a separation result and an analysis result.

Thus, the information processing device 100 is able to allow the user to refer to the information for each of the resources business-process by business-process and refer to the long-term variation tendencies of the processing amount business-process by business-process. As a result, the user may study, for example, addition of the resources of the business processing device 201 and the addition of the business processing device 201 included in the business processing system 200 in consideration of the loads applied to the resources of the business processing device 201.

In the example illustrated in FIG. 12, for example, the user may easily understand that there are a CPU daytime usage business process, a CPU 11 a.m. peak business process, and a nighttime disk write business process from the business-process by business-process component data resource by resource. Further, the user may understand that the processing amount of the CPU daytime usage business process and the nighttime disk write business process is increasing. This may facilitate study of addition of the business processing device 201 included in the business processing system 200.

Next, a mechanism is described in which, through the nonnegative matrix factorization, the basis matrix including, as columns, the basis vectors corresponding to the respective business processes and the weight matrix including, as rows, the weight vectors corresponding to the respective business processes are generated. Here, the business processes in the business processing system 200 have a characteristic of, for example, determining the usage states of the one or more resources based on the processing amounts of one or more business processes. The business processes in the business processing system 200 also have a characteristic in which, for example, the processing amount of the business processes tends to periodically vary at predetermined time intervals. Here, the length of each of the predetermined time intervals is a day, a week, a month, or the like.

These characteristics allow formation of a load model that utilizes the relationships in which each of the indexes indicating the usage states of the one or more resources is proportional to the processing amount of a corresponding one of the one or more business processes. For example, it is possible to form a load model in which the indexes indicating the usage states of the resources correspond to results obtained by adding up the indexes indicating the usage states of the resources corresponding to the processing amounts of the one or more business processes.

Furthermore, with these characteristics, among the time-series data indicating the temporal variation of the indexes indicating the usage states of the different resources, pieces of the component data corresponding to the same business process become similar to one another in periodical variation tendency at predetermined time intervals. Thus, it is desirable that, based on the load model, the indexes for different resources of the different business processing devices 201 be able to be integrally processed so as to allow collective separation of the resource by resource component data having similar periodical variation tendencies at the predetermined time intervals. Here, exemplary content of the load model is described with reference to FIGS. 13 and 14.

Figure 13:
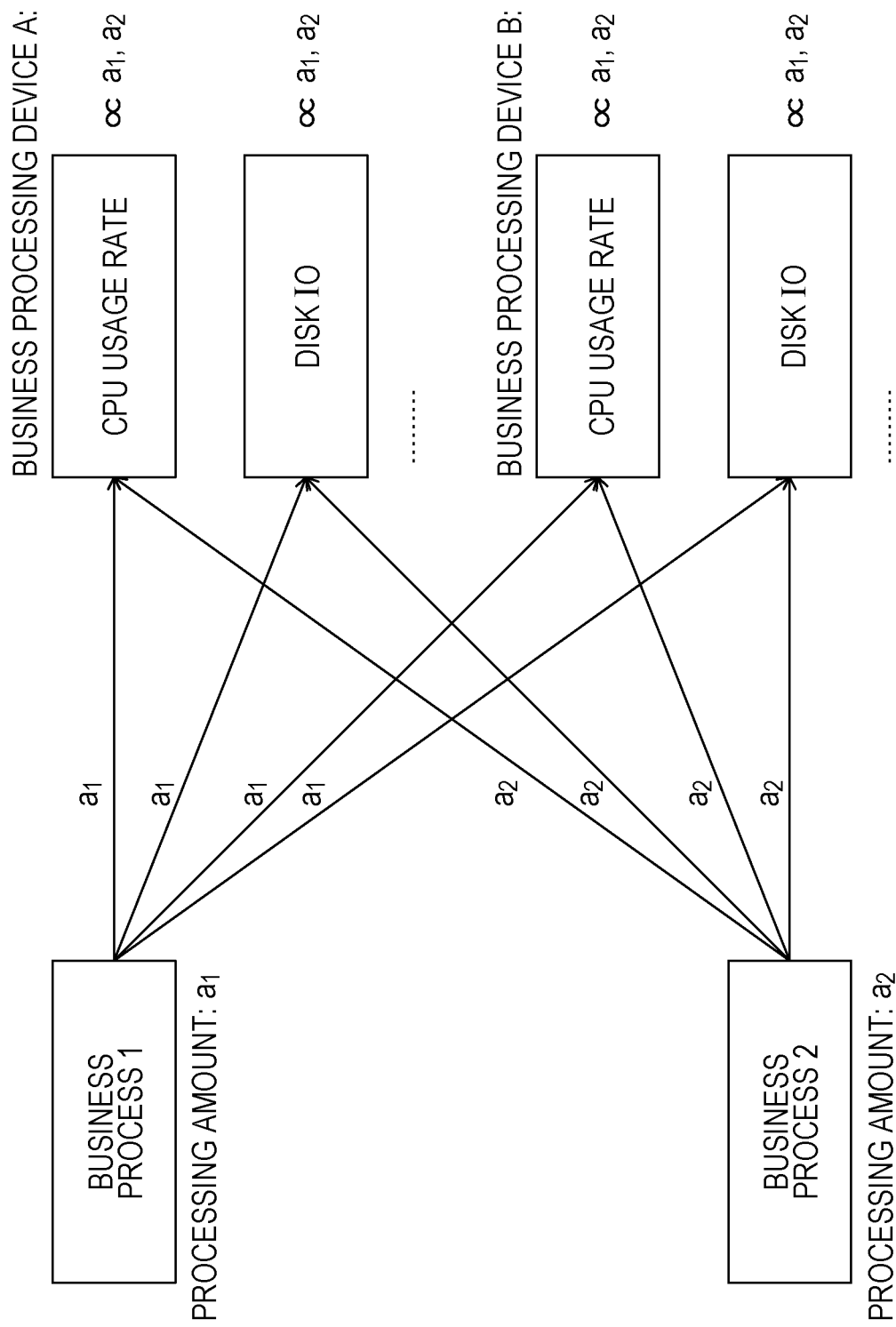
FIG. 13 is an explanatory diagram (No. 1) illustrating exemplary content of a load model.
Figure 14:
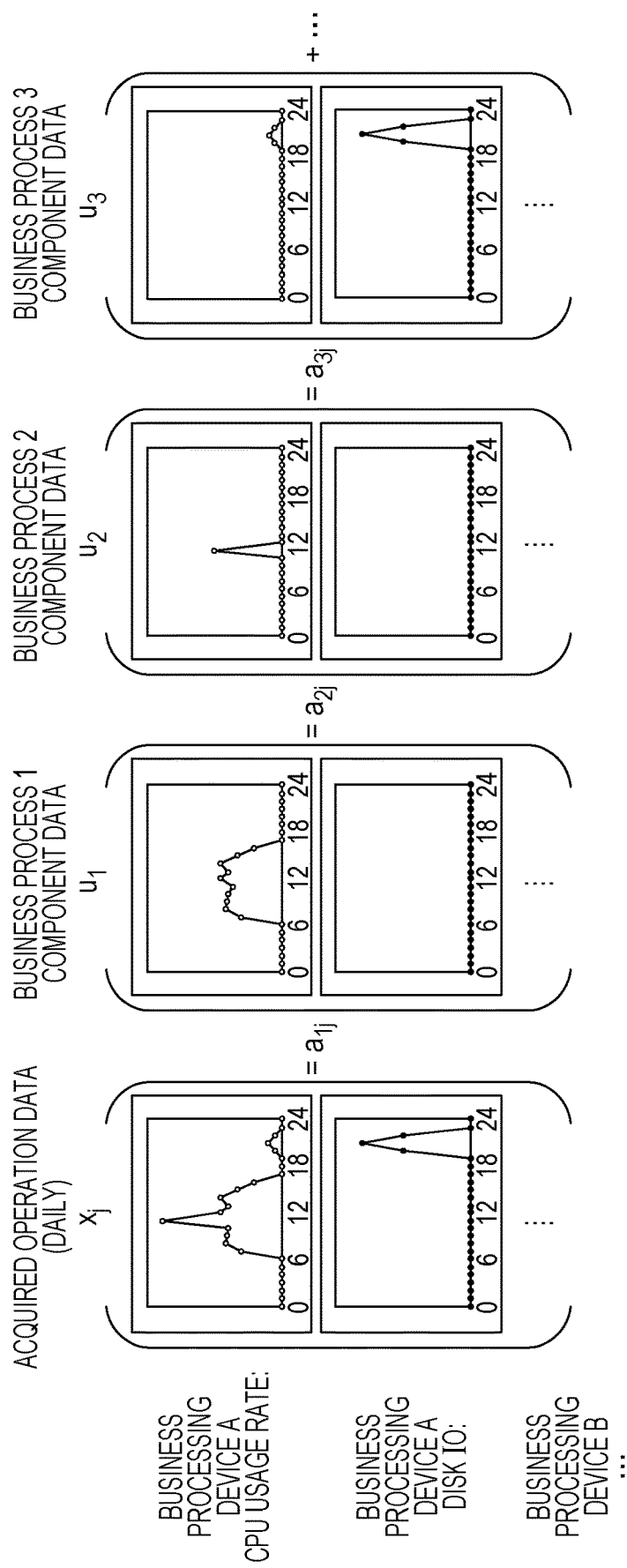
FIG. 14 is an explanatory diagram (No. 2) illustrating the exemplary content of the load model.

FIGS. 13 and 14 are explanatory diagrams illustrating exemplary content of the load model. In an example illustrated in FIG. 13, there are a business process 1 and a business process 2, and indexes are the CPU usage rate and the disk IO of a server A serving as one of the business processing devices 201 and the CPU usage rate and the disk IO of a server B serving as the other business processing device 201. In this case, the load model defines that the indexes are determined such that the indexes are proportional to a processing amount $a_1$ of the business process 1 and a processing amount $a_2$ of the business process 2. Thus, with this load model, the indexes of the different resources are able to be integrated and processed with reference to the processing amount $a_1$ of the business process 1 and the processing amount $a_2$ of the business process 2. Referring next to FIG. 14, a case where the load model is applied to the operation data is described.

As illustrated in FIG. 14, with the load model, a vector $x_j$ corresponding to the daily operation data for a single day is formed by linear combination of basis vectors $u_i$ and the weight coefficients $a_{ij}$ for the resources for the business processes. The value "j" indicates where is the day on which the daily operation data is observed in the sequence of days. Thus, it is thought that, by dividing a vector $x_j$ corresponding to the daily operation data for a single day into the basis vectors $u_i$ and weight vectors $a_i$ (weight coefficients $a_{ij}$), information about each of the business process is able to be acquired resource by resource. The vector $x_j$ is, when expressed mathematically, expressed by the following equation (1). N is the basis number.

$$x_j = \Sigma_{i=1}^{N}(a_{ij} \times u_i) \quad (1)$$

The equation (1) above is, when expressed in the form of matrix, expressed by the following equation (2) in which X is an operating data matrix, $X=(x_1, x_2, \ldots )$, U is a basis matrix, $U=(u_1, u_2, \ldots )$, and A is the weight matrix. $A=(a_1, a_2, \ldots )=(a_{ij})$.

$$X = UA \quad (2)$$

Here, according to Reference 2 below, the nonnegative matrix factorization has a characteristic of extracting a frequently occurring component of each of the vectors of the matrix of interest. The frequently occurring component has a periodical variation tendency. Thus, when the nonnegative matrix factorization is performed on the operation data matrix, it is thought that the component data indicating the periodical variation tendency is able to be extracted as the frequently occurring component. For example, it is thought that the business-process by business-process component data, resource by resource, corresponding to the frequently occurring component is able to be extracted as the basis vector of the basis matrix.

Reference 2: SAWADA, Hiroshi, "Nonnegative Matrix Factorization and Its Applications to Data/Signal Analysis." The journal of the Institute of Electronics, Information and Communication Engineers, 95 (9), 829-833, 2012.

Thus, the information processing device 100 applies the nonnegative matrix factorization to the above-described equation (2) expressed in the matrix form, and generates the basis matrix including the basis vectors corresponding to the component data for the respective resources business-process by business-process. For the nonnegative matrix factorization, for example, Reference 1 described above is able to be referred to. As the sparseness constraints described in Reference 1, for example, an L1 norm is used. In the nonnegative matrix factorization, for example, a weight A and a basis U that minimize the following equation (3) are estimated. $\|z\|_{FRO}$ is a Frobenius norm. The terms $\alpha\|A\|_1$ and $\beta\|U\|_1$ are sparseness constraints.

$$(A^*, U^*) = \mathrm{argmin}_{A,U}(\tfrac{1}{2}\|X - UA\|_{FRO}^2) + \alpha\|A\|_1 + \beta\|U\|_1 \quad (3)$$

When the terms $\alpha\|A\|_1$ and $\beta\|U\|_1$ are used as described above, the weights and basis are induced to become zero as much as possible. Thus, with the nonnegative matrix factorization using the above-described equation (3), the component data for each of the resources business-process by business-process may be easily formed in a form that is easily understood by the user.

The information processing device 100 is able to acquire the component data for each of the resources business-process by business-process by separating the basis vectors $u_i$ of the generated basis matrix U for the respective resources of each of the business processing devices 201. For example, the information processing device 100 separates $u_{ACi}^T$, $u_{ADi}^T$, $u_{BCi}^T$, $u_{BDi}^T$, and so forth from $u_i^T = u_{ADi}^T, \ldots, u_{BCi}^T, u_{BDi}^T, \ldots$ ). Here, $u_0^T$ is the component data of the CPU usage rate of the server A. The $u_{ADi}^T$ is the component data of the disk IO of the server A. The $u_{BCi}^T$ is the component data of the CPU usage rate of the server B. The $u_{BDi}^T$ is the component data of the disk IO of the server B.

In this way, the information processing device 100 is able to allow the indexes for the resources to be daily collectively processed as respective columns of the matrix, thereby allowing the frequently occurring components having the similar daily periodical variation tendencies to be extracted when the nonnegative matrix factorization is performed. Accordingly, the information processing device 100 is able to allow the extraction of the resource by resource component data having similar daily periodical variation tendencies corresponding to the resource by resource component data business-process by business-process through the nonnegative matrix factorization.

Furthermore, the information processing device 100 is able to allow the indexes associated with different resources of the different business processing devices 201 to be integrally processed as respective columns of the matrix. Thus, the information processing device 100 is able to identify and extract from the time-series data associated with one or more resources, through the nonnegative matrix factorization, combinations of pieces of the component data corresponding to the same business process. Furthermore, when the usage tendencies in the plurality of business processes for any of the resources are similar to one another and pieces of the component data corresponding to the respective business processes are similar to one another, the information processing device 100 is able to separate and extract the pieces of the component data corresponding to the respective business processes through the nonnegative matrix factorization. Referring next to FIGS. 15 to 27, an example of operation of the information processing device 100 is described.

Figure 15:
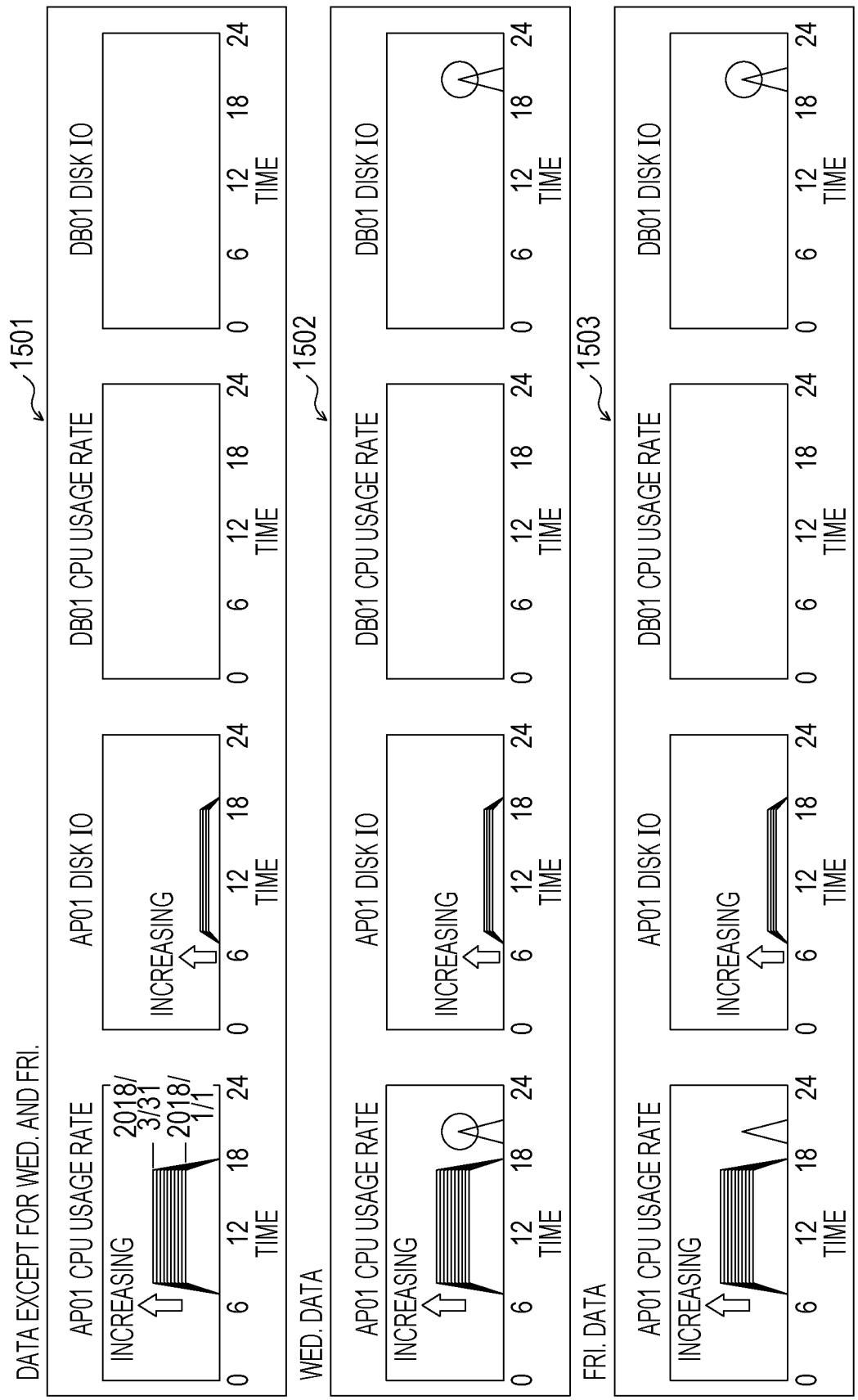
FIG. 15 is an explanatory diagram (No. 1) illustrating an example of operation of the information processing device.

FIGS. 15 to 27 are explanatory diagrams illustrating the example of the operation of the information processing device 100. In the example illustrated in FIGS. 15 to 27, the business processing system 200 includes a server AP01 and a server DB01 as the business processing devices 201. The indexes of the resources are the CPU usage rate and the disk IO. The indexes are normalized between 0 and 1. The sampling interval for the indexes are, for example, an hour. The number of times of sampling per day is 24. The information processing device 100 acquires operation data corresponding to 90 days from Jan. 1, 2018 to Mar. 31, 2018 and stores the acquired operation data in the operation table 400. Referring next to FIG. 15, the variation tendency of the index for each of the resources in the operation data is described.

As illustrated in FIG. 15, the operation data has periodicity on each day of the week. Furthermore, the indexes tend to increase in the operation data. For example, as illustrated in a graph group 1501, the CPU usage rate and the disk IO of the server AP01 tend to increase on days of the week except for Wednesday and Friday. For example, as illustrated in a graph group 1502, the CPU usage rate and the disk IO of the server AP01 tend to increased on Wednesday. Furthermore, loads tend to be generated in both the CPU usage rate of the server AP01 and the disk IO of the server DB01 at the same time. For example, as illustrated in a graph group 1503, the CPU usage rate and the disk IO of the server AP01 tend to increase on Friday. Furthermore, a load similar to the loads generated on Wednesday tends to be generated in the disk IO of the server DB01.

Here, when the load of the CPU usage rate of the server AP01 and the load of the disk IO of the server DB01 generated at the same time on Wednesday are caused by the same business process, it is preferable that pieces of the component data including the respective loads be extracted as the component data of the same business process. When the loads of the disk IO of the server DB01 on Wednesday and Friday are caused by different business processes, it is preferable that the loads on Wednesday and Friday be separately included in the component data of the disk IO of the different business processes. Referring next to FIG. 16, operation of the information processing device 100 using the operation data having the variation tendency illustrated in FIG. 15 are described.

In FIG. 16, the information processing device 100 separates the operation data stored in the operation table 400 into single-day data so as to generate daily operation data. For example, the information processing device 100 generates daily operation data with the date of "20180101", daily operation data with the date "20180102", and so forth and stores the daily operation data by using the daily table 500. Next, description continues with reference to FIG. 17.

Referring to FIG. 17, the information processing device 100 vectorizes the daily operation data. For example, the information processing device 100 arranges the one or more indexes indicated by the daily operation data stored in the daily table 500 to vectorize the daily operation data in which the indexes are elements according to the predetermined rules and stores the vectorized daily operation data by using the vector table 600. For example, the daily operation data with the date of "20180101" is stored in the vector table 600 as the vector $x_1$. For example, the daily operation data with the date of "20180102" is stored in the vector table 600 as the vector $x_2$. The vector is 96 dimensional. Next, description continues with reference to FIG. 18.

Figure 18:
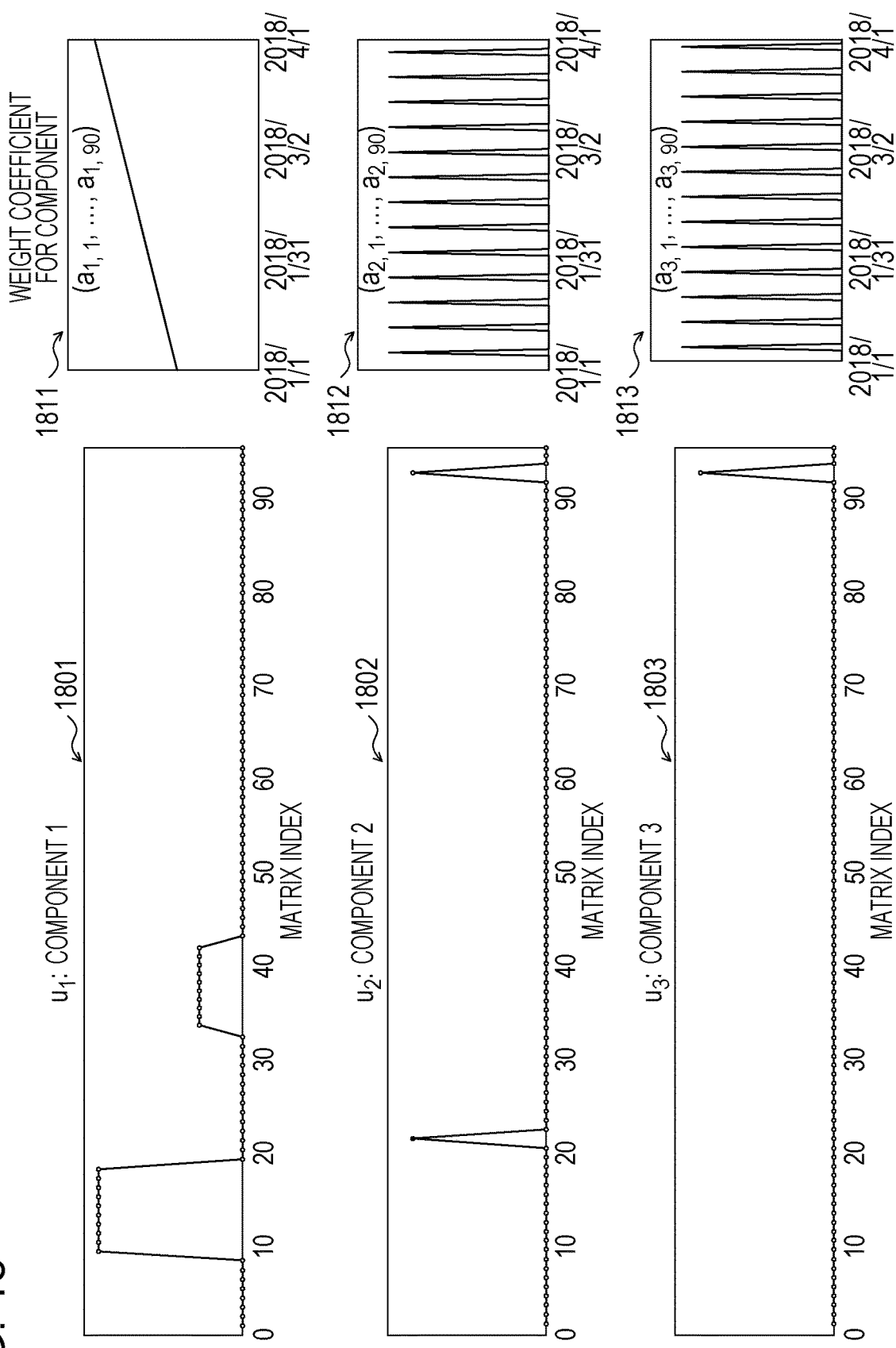
FIG. 18 is an explanatory diagram (No. 4) illustrating the example of the operation of the information processing device.

Referring to FIG. 18, the information processing device 100 refers to the vector table 600 and generates an operation data matrix $X=(x_1, x_2, \ldots, x_{90})$ in which vectors $x_1, x_2, \ldots, x_{90}$ corresponding to the respective days of 90 days are set as the columns. The operating data matrix X is a 96×90 matrix. The information processing device 100 performs the nonnegative matrix factorization on the operation data matrix X by using the above-described equation (3), thereby generating the basis matrix U and the weight matrix A. It is assumed that, in the above-described equation (3), $\alpha=\beta=0.01$.

In so doing, the information processing device 100, which has set the basis number=3 in advance, defines the basis matrix $U=(u_1, u_2, u_3)$. The basis matrix U is a 96×3 matrix. Furthermore, the information processing device 100 defines the weight matrix $A=(a_1, a_2, a_3)=(a_{ij})$. The weight matrix A is a 3×90 matrix.

As a result, the information processing device 100 generates the basis matrix U including the basis vectors $u_1, u_2$, and $u_3$ as illustrated in graphs 1801 to 1803. Also, the information processing device 100 generates the weight matrix A including weight vectors $a_1, a_2$, and $a_3$ as illustrated in graphs 1811 to 1813. The weight vector $a_1=(a_{1,1}, a_{1,90})$. The weight vector $a_2=(a_{2,1}, \ldots, a_{2,90})$. The weight vector $a_3=(a_{3,1}, \ldots a_{3,90})$.

Here, the basis number has been set in advance. However, this is not limiting. For example, the number of dimensions of the vectors forming the operation data matrix may be used as the basis number. In this case, according to the terms $\alpha\|A\|_1$ and $\beta\|U\|_1$ in the above-described equation (3), the weight coefficient applied to the basis vector which is not preferable as the business-process by business-process component data tends to become zero. Thus, the information processing device 100 excludes the basis vector $u_i$ corresponding to the weight vector $a_i$ for which the sum of the weight coefficients is zero. Accordingly, the information processing device 100 may accurately generate the basis matrix U. Next, description continues with reference to FIG. 19.

Referring to FIG. 19, the information processing device 100 stores the basis vectors of the generated basis matrix by using the component table 700. Similarly to the vectors forming the operation data matrix, the basis vector is 96 dimensional. Next, description continues with reference to FIG. 20.

Figure 20:
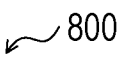
FIG. 20 is an explanatory diagram (No. 6) illustrating the example of the operation of the information processing device.

Referring to FIG. 20, the information processing device 100 stores the weight vectors of the generated weight matrix by using the weight table 800. Corresponding to the number of the days, the weight vector is 90 dimensional. Next, description continues with reference to FIG. 21.

Figure 21:
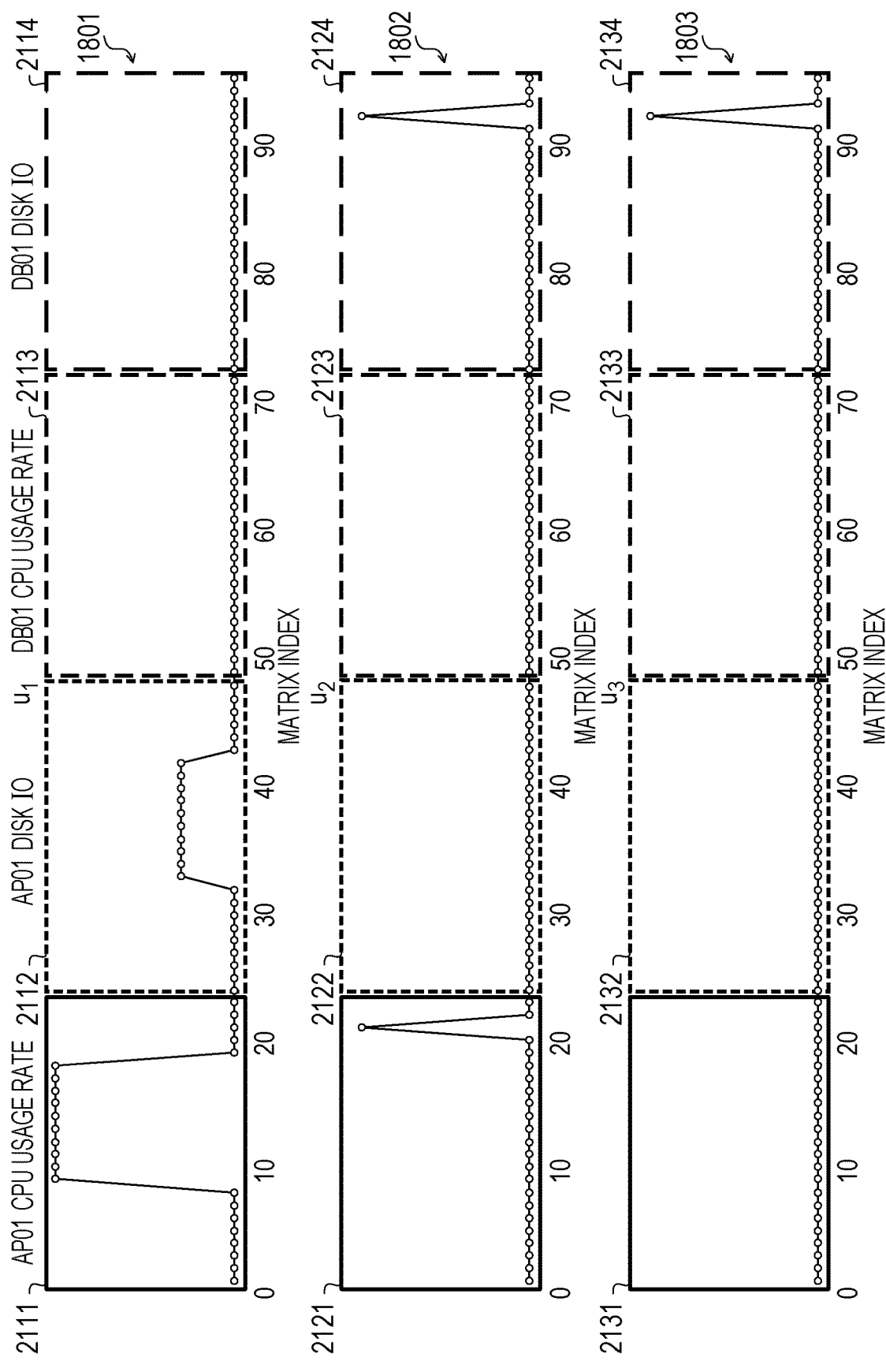
FIG. 21 is an explanatory diagram (No. 7) illustrating the example of the operation of the information processing device.

Referring to FIG. 21, the information processing device 100 separates the component values of the basis vectors $u_1, u_2, u_3$ illustrated in the graphs 1801 to 1803 according to the resources so as to acquire the resource by resource component data. The information processing device 100 separates the component values of the basis vectors $u_1, u_2, u_3$ based on ranges of 24 component values 2111 to 2114, 2121 to 2124, 2131 to 2134 to acquire as the resource by resource component data. The number of component values, 24, corresponds to the number of sampling per day. Next, description continues with reference to FIG. 22.

Figure 22:
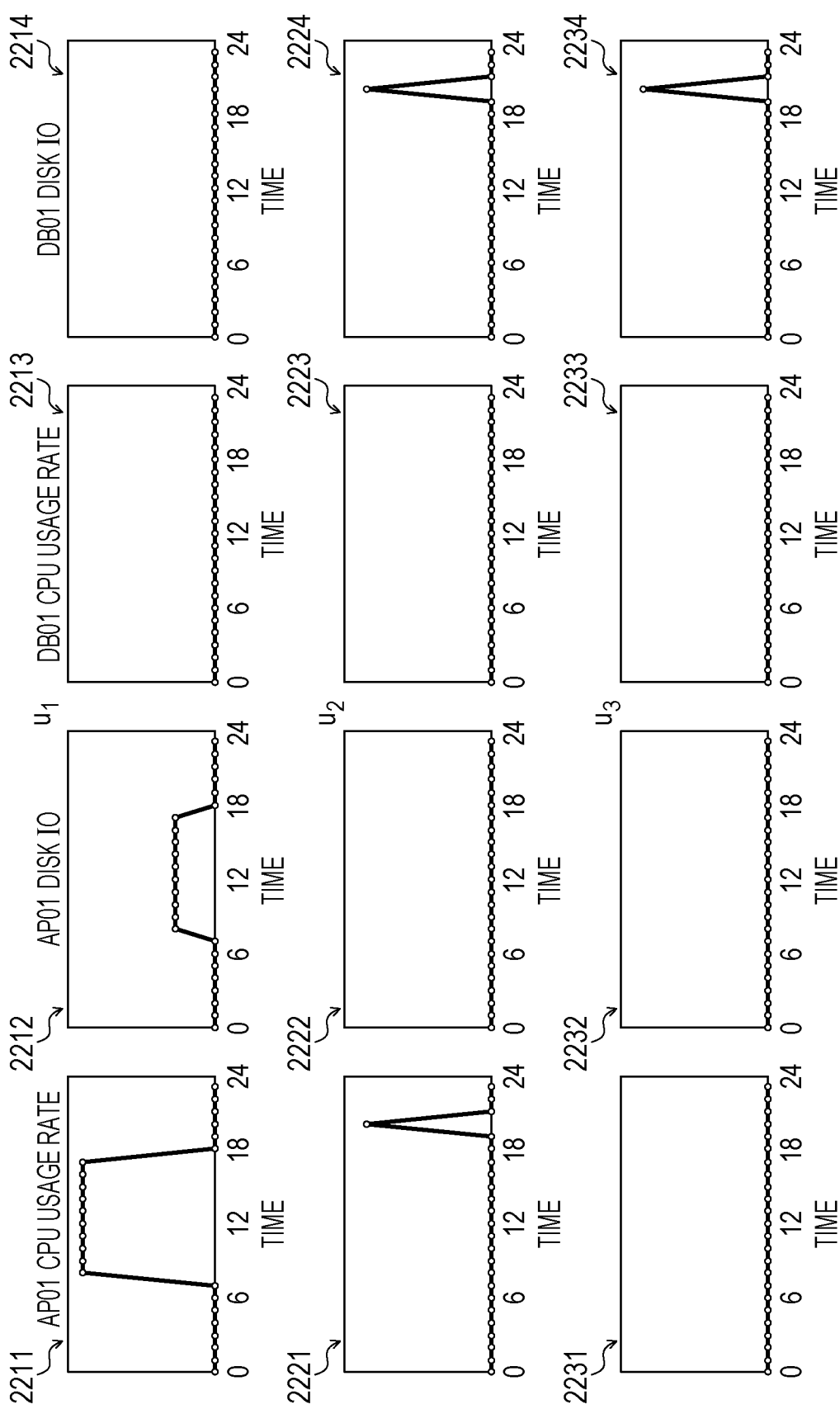
FIG. 22 is an explanatory diagram (No. 8) illustrating the example of the operation of the information processing device.

Referring to FIG. 22, as a result of the separation, the information processing device 100 acquires the component data 2211 to 2214 of the CPU usage rates and the disk IOs of the server AP01 and the server DB01 corresponding to one of the business processes. Furthermore, as a result of the separation, the information processing device 100 acquires the component data 2221 to 2224 of the CPU usage rates and the disk IOs of the server AP01 and the server DB01 corresponding to one of the business processes.

Figure 23:
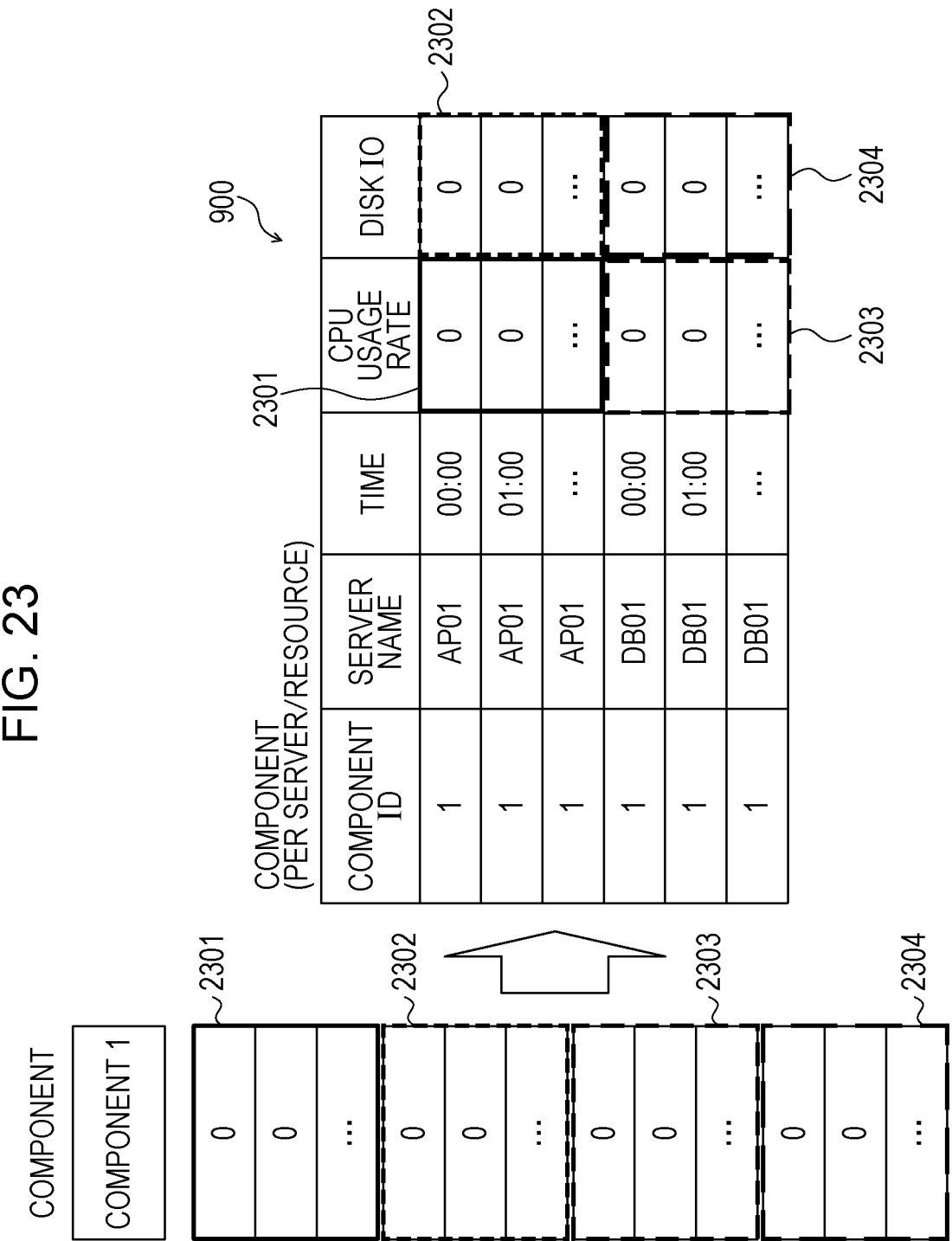
FIG. 23 is an explanatory diagram (No. 9) illustrating the example of the operation of the information processing device.

Furthermore, as a result of the separation, the information processing device 100 acquires the component data 2231 to 2234 of the CPU usage rates and the disk IOs of the server AP01 and the server DB01 corresponding to one of the business processes. Referring next to FIG. 23, how the information processing device 100 performs resource by resource separation of the component values from the component table 700 is described.

Referring to FIG. 23, the information processing device 100 separates component values from the component table 700 resource by resource in accordance with the predetermined rules. For example, in the example of FIG. 17, when the one or more indexes indicated by the daily operation data are vectorized by arranging the indexes as the elements of the vector according to the predetermined rules, the CPU usage rate of the server AP01 is arranged as the first to twenty-fourth elements of the vector. Accordingly, when the component values are separated from the component table 700 resource by resource, the component values from the first to twenty-fourth of the basis vector are separated as the component values associated with the CPU usage rate of the server AP01.

For example, a component value group 2301 of the component table 700 is stored as the component values associated with the CPU usage rate of the server AP01 in the separation result table 900. A component value group 2302 of the component table 700 is stored as the component values associated with the disk IO of the server AP01 in the separation result table 900. A component value group 2303 of the component table 700 is stored as the component values associated with the CPU usage rate of the server DB01 in the separation result table 900. A component value group 2304 of the component table 700 is stored as the component values associated with the disk IO of the server DB01 in the separation result table 900. In so doing, unlike the operation data, the date information is not provided in the separation result table 900. Next, description continues with reference to FIG. 24.

Figure 24:
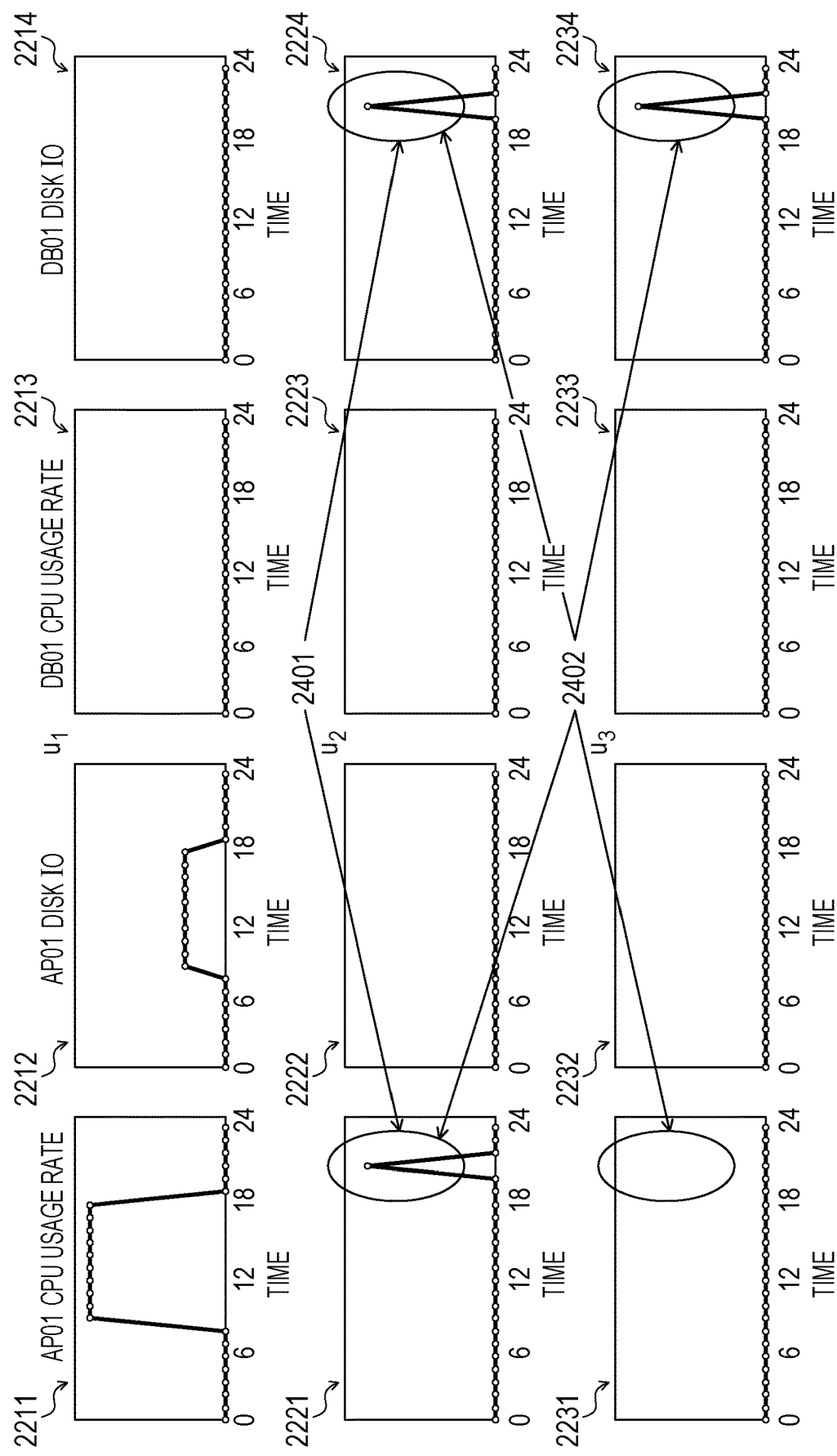
FIG. 24 is an explanatory diagram (No. 10) illustrating the example of the operation of the information processing device.

With reference to FIG. 24, the following is described: the component data is acquired resource by resource in a preferable form for each of the business processes by the operation of the information processing device 100 illustrated in FIGS. 16 to 23.

As has been described with reference to FIG. 15, it is preferable that the component data that includes the load of the CPU usage rate of the server AP01 and the load of the disk IO of the server DB01 generated at the same time be extracted as the component data of the same business process. In this regard, as illustrated in FIG. 24, the information processing device 100 is, as indicated by sign 2401, able to extract the component data that includes the load of the CPU usage rate of the server AP01 and the load of the disk IO of the server DB01 generated at the same time and that corresponds to the same business process.

Furthermore, as has been described with reference to FIG. 15, it is preferable that the loads on the disk IO of the server DB01 be separately included in the component data of the disk IO of the different business processes. In this regard, as illustrated in FIG. 24, the information processing device 100 is, as indicated by sign 2402, able to extract the component data such that the loads of the disk IO of the server DB01 are separately included in the component data of the disk IO of the different business processes.

In this way, the information processing device 100 allows, through the nonnegative matrix factorization, combinations of pieces of the component data corresponding to the same business process to be identified and extracted from pieces of the time-series data respectively associated with the one or more resources. Furthermore, when the usage tendencies in the plurality of business processes for any of the resources are similar to one another and pieces of the component data corresponding to the respective business processes are similar to one another, the information processing device 100 is able to separate and extract the pieces of the component data corresponding to the respective business processes through the nonnegative matrix factorization. Next, description continues with reference to FIG. 25.

Figure 25:
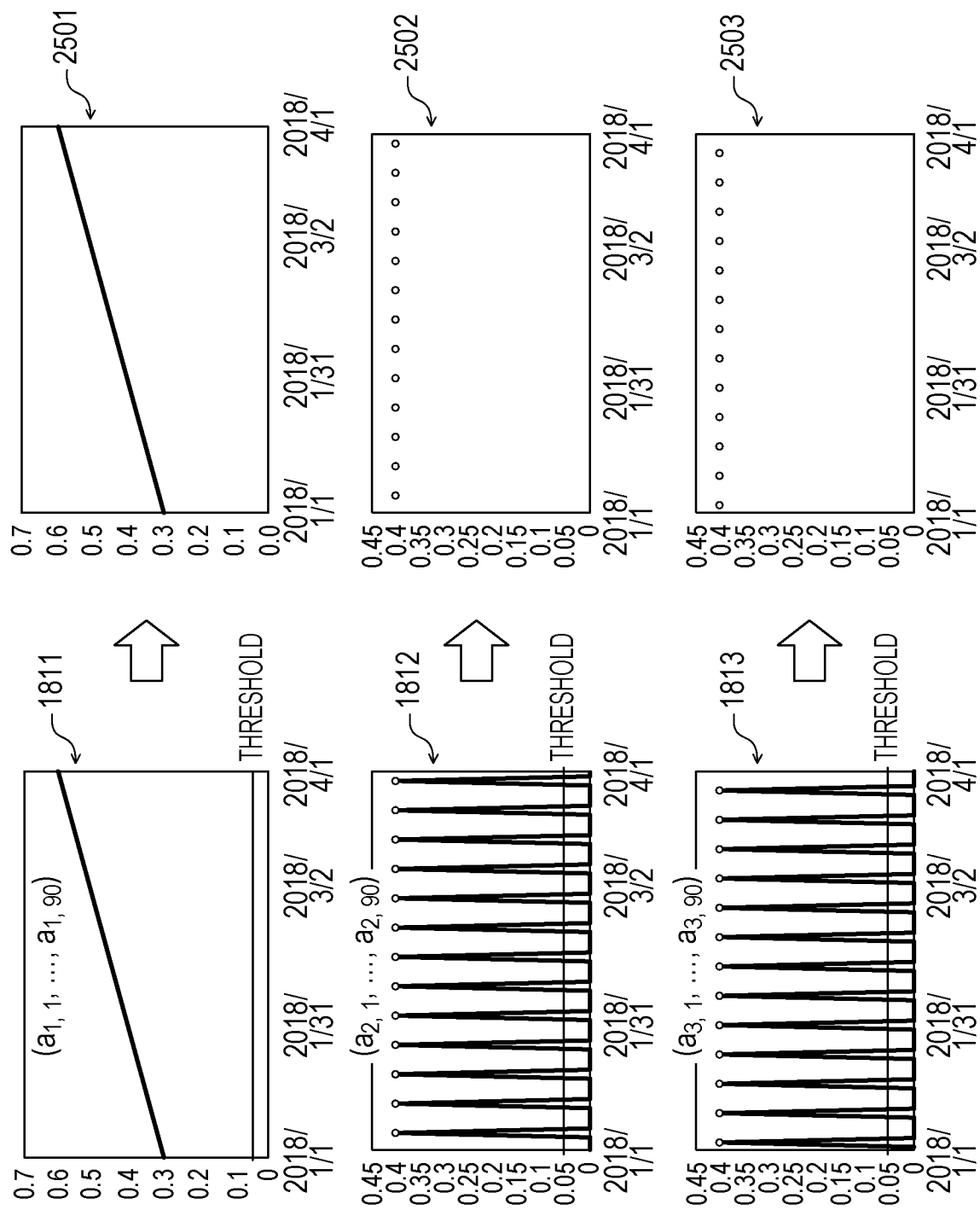
FIG. 25 is an explanatory diagram (No. 11) illustrating the example of the operation of the information processing device.

Referring to FIG. 25, the information processing device 100 analyzes the long-term variation tendency of the business-process by business-process processing amount based on the weight vectors $a_1$, $a_2$, $a_3$ as illustrated in graphs 1811 to 1813. For example, the information processing device 100 deletes the weight coefficients smaller than or equal to thresholds from the weight coefficients of the weight vectors $a_1$, $a_2$, $a_3$. For example, as a result of the deletion, performed by the information processing device 100, of the weight coefficient smaller than or equal to the threshold from each of the weight vectors $a_1$, $a_2$, $a_3$, the weight coefficients as illustrated in graphs 2501 to 2503 remain. Next, description continues with reference to FIG. 26.

Figure 26:
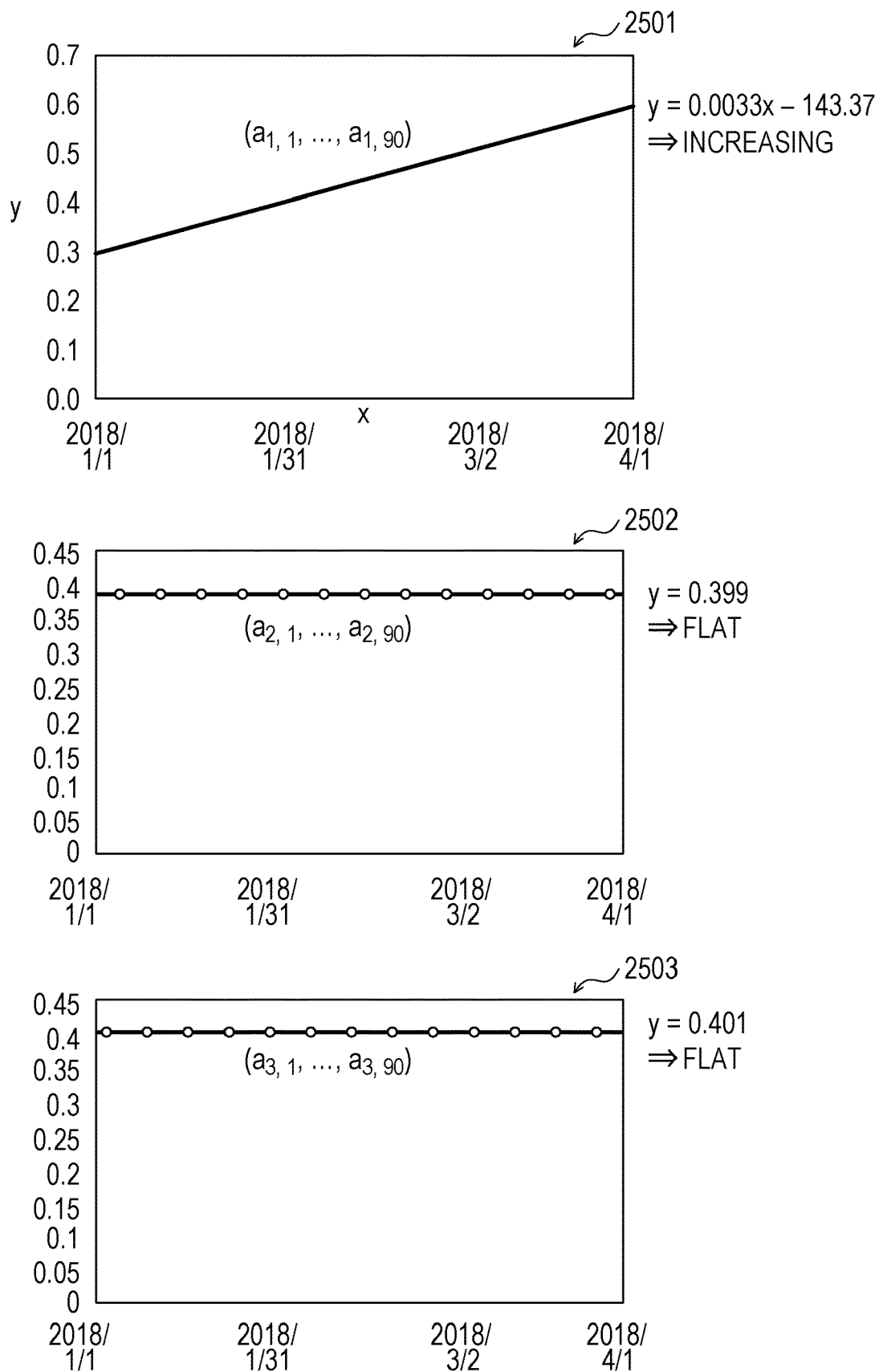
FIG. 26 is an explanatory diagram (No. 12) illustrating the example of the operation of the information processing device.

Referring to FIG. 26, the information processing device 100 performs linear regression on the weight coefficients after the deletion, generates regression lines, and stores the generated regression lines in the long-term tendency table 1000. Furthermore, the information processing device 100 identifies, based on the inclination of each of the regression lines, one of the increase tendency, flat, or the decrease tendency as the increase/decrease tendency and stores the identified increase/decrease tendency in the long-term tendency table 1000. For example, when inclination>−threshold, the information processing device 100 identifies this as the increase tendency. For example, when −threshold<inclination threshold, the information processing device 100 identifies this as the flat. For example, when inclination<−threshold, the information processing device 100 identifies this as the decrease tendency. The threshold value is, for example, 0.001. Next, description continues with reference to FIG. 27.

Figure 27:
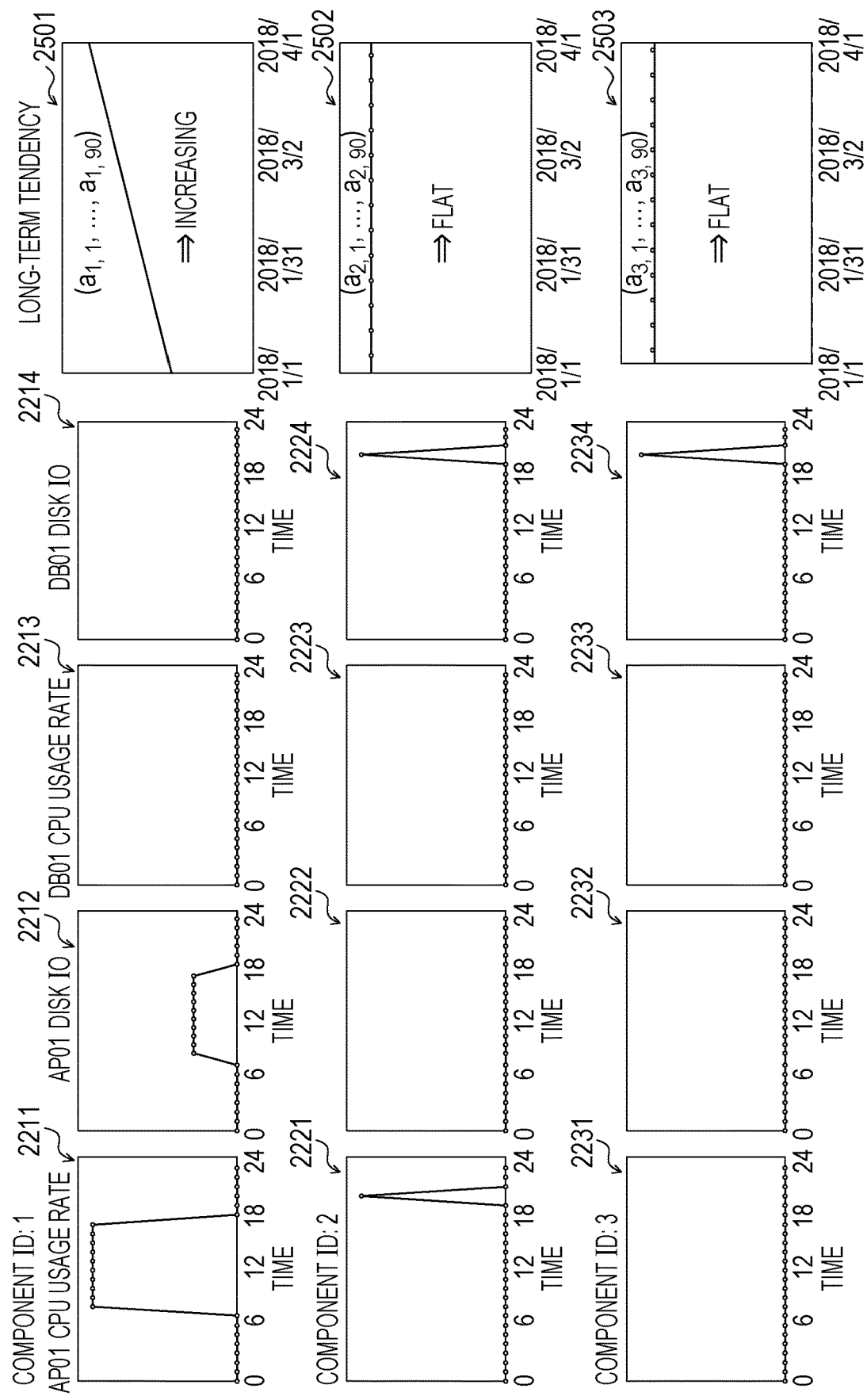
FIG. 27 is an explanatory diagram (No. 13) illustrating the example of the operation of the information processing device.

Referring to FIG. 27, the information processing device 100 displays the component data 2211 to 2214, 2221 to 2224, 2231 to 2234 being the results of the separation so as to allow the user to refer to the component data. Furthermore, the information processing device 100 displays the component data 2211 to 2214, 2221 to 2224, 2231 to 2234 so as to allow the user to refer to the component data with the weight coefficients and the increase/decrease tendencies as the analysis results illustrated in graphs 2501 to 2503 associated with the corresponding component data. Accordingly, the user may study, for example, addition of the resources of the business processing device 201 and the addition of the business processing device 201 included in the business processing system 200 in consideration of the load applied to the resources of the business processing device 201.

(Procedure of Entire Processing)

Next, an example of a procedure of entire processing performed by the information processing device 100 is described with reference to FIG. 28. The entire processing is realized by, for example, the CPU 301, the storage areas of the memory 302, the recording medium 305, and the like, and the network I/F 303 illustrated in FIG. 3.

FIG. 28 is a flowchart illustrating an example of the procedure of the entire processing. Referring to FIG. 28, the information processing device 100 accepts a start trigger (step S2801). The start trigger is, for example, regularly automatically generated or generated by an operational input by the user.

Next, the information processing device 100 collects the operation data from each of the one or more business processing devices 201 (step S2802). Then, the information processing device 100 divides operation data of plurality of pieces of the operation data having been collected into the daily operation data (step S2803).

Next, the information processing device 100 collectively vectorizes, day by day, the divided operation data so as to generate an operation data matrix in which the vectors per day are arranged as columns (step S2804). Then the information processing device 100 performs the nonnegative matrix factorization on the generated operation data matrix based on the basis numbers so as to generate the basis matrix and the weight matrix (step S2805).

Next, the information processing device 100 separates, resource by resource, the one or more component values in each of the business processes included in the basis vector corresponding to the business process included in the basis matrix (step S2806). Then, the information processing device 100 analyzes the long-term variation tendency of the business-process by business-process processing amount based on the weight vector corresponding to the business process included in the weight matrix (step S2807).

Next, the information processing device 100 associates the result obtained by separating the one or more component values for each of the resources in each of the business processes with the analyzed result of the long-term variation tendency of the processing amount of the resource in the business process and outputs the associated result (step S2808). Then, the information processing device 100 ends the entire processing. Thus, the information processing device 100 allows the user to easily analyze the time-series data and the variation tendency of the processing amount business-process by business-process.

Here, the information processing device 100 may partially change the order of processing of the steps illustrated in FIG. 28. For example, the step S2806 and the step S2807 may be processed in the reversed order. Further, the information processing device 100 may omit processing of a subset of the steps illustrated in FIG. 28. For example, the processing in step S2807 may be omitted. In this case, the result of the analysis is not output in the processing of step S2808.

As has been described, with the information processing device, the time-series data indicating the temporal variation of the index indicating the usage state of each of the one or more resources is able to be acquired. Based on the acquired time-series data, with the information processing device, it is possible to generate the matrix including, as the columns or rows, the vectors at the predetermined time intervals having the elements that are the indexes indicating the usage states of the one or more resources at the predetermined time intervals. With the information processing device, the nonnegative matrix factorization is able to be performed on the generated matrix so as to generate the basis matrix including the predetermined number of basis vectors as the columns or rows. With the information processing device, the one or more component values indicated by the predetermined number of basis vectors included in the generated basis matrix are separated for each of the one or more resources, and the result of the separation is able to be output. Thus, the information processing device is able to output information about each of the one or more resources business-process by business-process. As a result, with the information processing device, the user may easily analyze the time-series data and a usage tendency of each of the one or more resources at the predetermined time intervals business-process by business-process.

With the information processing device, the nonnegative matrix factorization is able to be performed on the generated matrix so as to generate the weight matrix that includes the predetermined number of weight vectors as the columns or rows and that, when multiplied by the basis matrix, indicates the generated matrix. With the information processing device, information about each of the predetermined number of weight vectors included in the generated weight matrix is able to be output. Thus, the information processing device is able to allow the user to easily understand the long-term variation tendency of the processing amount business-process by business-process.

With the information processing device, a number that is set based on the number of business processes to be performed by using at least one of the one or more resources may be used as the predetermined number. Accordingly, the information processing device may accurately acquire information about each of the one or more resources business-process by business-process and reduce a processing amount required for nonnegative matrix factorization due to reduction of the number of basis vectors.

With the information processing device, a number that is set based on the number of dimensions of the vector may be used as the predetermined number. Thus, with the information processing device, information about each of the one or more resources business-process by business-process may be accurately acquired even when the number of business processes is unknown.

With the information processing device, the one or more resources may include different types of resources in the same device. Accordingly, when a single business process affects different types of resources in the same device, the information processing device is able to acquire the component data of each of the different types of resources in the same device in a form corresponding to the single business process.

With the information processing device, the one or more resources may include resources in the different devices. Accordingly, when a single business process affects the resources in the different devices, the information processing device is able to acquire the component data of each of the resources in the different devices in a form corresponding to the single business process.

With the information processing device, the acquired time-series data is able to be divided into time-series data at predetermined time intervals. With the information processing device, it is possible to generate the matrix including, as the columns or rows, the vectors at the predetermined time intervals having the elements that are the one or more indexes of the resources indicated by the divided time-series data of the at predetermined time intervals. Thus, the information processing device is able to process the acquired time-series data to allow the performing of the nonnegative matrix factorization utilizing the periodical variation tendency in processing amount of the business processes. Thus, it is not required for the information processing device to acquire the time-series data at the predetermined time intervals, and accordingly, the number of times of communication with the business processing devices may be reduced.

The method of outputting described according to the present embodiment is able to be realized by causing a computer such as a personal computer or a workstation to execute a prepared program. The output program described according to the present embodiment is recorded on a computer-readable recording medium such as a hard disk, a flexible disk, a CD-ROM, a magneto-optical (MO) disk, or a digital versatile disk (DVD) and is executed as a result of being read from the recording medium by a computer. The output program described according to the present embodiment may be distributed through a network such as the Internet.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory, computer-readable recording medium having stored therein a program for causing a computer to execute a process comprising:
   acquiring time-series data indicating a temporal variation of an index, the index indicating a usage state of each of one or more resources that are used by multiple processes;
   forming a load model in which the index is proportional to a processing amount of each of the multiple processes, the load model to separate, from the time-series data associated with each of the one or more resources, pieces of component data having corresponding periodical variation tendencies at predetermined time intervals;
   generating, based on the acquired time-series data, an operation-data matrix including vectors as columns or rows such that each of the vectors indicates the time-series data at a predetermined time interval and includes as an element the index indicating the usage state of one of the one or more resources at the predetermined time interval;
   performing nonnegative matrix factorization on the generated operation-data matrix to generate a basis matrix including a predetermined number of basis vectors as columns or rows, the basis vectors indicating the component data of the one or more resources having corresponding periodical variation tendencies at the predetermined time intervals;
   extracting one or more component values indicated by each of the predetermined number of the basis vectors included in the generated basis matrix, the extracted one or more components values corresponding to the one or more resources, respectively; and
   outputting information on the extracted one or more component values as usage states of the one or more resources that are used by each of the multiple processes.

2. The non-transitory, computer-readable recording medium of claim 1, the process further comprising:
   performing nonnegative matrix factorization on the operation-data matrix to generate a weight matrix including the predetermined number of weight vectors as rows or columns such that the generated matrix is represented as a product of the basis matrix and the generated weight matrix; and
   outputting information on each of the predetermined number of the weight vectors included in the weight matrix.

3. The non-transitory, computer-readable recording medium of claim 1, wherein
   the predetermined number is set based on a number of processes to be performed by using at least one of the one or more resources.

4. The non-transitory, computer-readable recording medium of claim 1, wherein
   the predetermined number is set based on a number of dimensions of the vectors.

5. The non-transitory, computer-readable recording medium of claim 1, wherein
   the one or more resources include different types of resources in a single device.

6. The non-transitory, computer-readable recording medium of claim 1, wherein
   the one or more resources include resources in different devices.

7. The non-transitory, computer-readable recording medium of claim 1, the process further comprising:
   dividing the time-series data into pieces of the time-series data such that the pieces of the time-series data respectively correspond to time intervals each equal to the predetermined time interval; and
   generating the operation-data matrix including vectors such that the vectors include as elements one or more indexes indicated by the pieces of the time-series data.

8. A method performed by a computer, the method comprising:
   acquiring time-series data indicating a temporal variation of an index, the index indicating a usage state of each of one or more resources that are used by multiple processes;
   forming a load model in which the index is proportional to a processing amount of each of the multiple processes, the load model to separate, from the time-series data associated with each of the one or more resources, pieces of component data having corresponding periodical variation tendencies at predetermined time intervals;
   generating, based on the acquired time-series data, an operation-data matrix including vectors as columns or rows such that each of the vectors indicates the time-series data at a predetermined time interval and includes as an element the index indicating the usage state of one of the one or more resources at the predetermined time interval;
   performing nonnegative matrix factorization on the generated operation-data matrix to generate a basis matrix including a predetermined number of basis vectors as columns or rows, the basis vectors indicating the component data of the one or more resources having corresponding periodical variation tendencies at the predetermined time intervals;
   extracting one or more component values indicated by each of the predetermined number of the basis vectors included in the generated basis matrix, the extracted one or more components values corresponding to the one or more resources, respectively; and outputting information on the extracted one or more component values as usage states of the one or more resources that are used by each of the multiple processes.

9. An apparatus comprising:
a memory; and
a processor coupled to the memory and configured to:
acquire time-series data indicating a temporal variation of an index, the index indicating a usage state of each of one or more resources that are used by multiple processes,
form a load model in which the index is proportional to a processing amount of each of the multiple processes, the load model to separate, from the time-series data associated with each of the one or more resources, pieces of component data having corresponding periodical variation tendencies at predetermined time intervals,
generate, based on the acquired time-series data, an operation-data matrix including vectors as columns or rows such that each of the vectors indicates the time-series data at a predetermined time interval and includes as an element the index indicating the usage state of one of the one or more resources at the predetermined time interval,
perform nonnegative matrix factorization on the generated operation-data matrix to generate a basis matrix including a predetermined number of basis vectors as columns or rows, the basis vectors indicating the component data of the one or more resources having corresponding periodical variation tendencies at the predetermined time intervals,
extract one or more component values indicated by each of the predetermined number of the basis vectors included in the generated basis matrix, the extracted one or more components values corresponding to the one or more resources, respectively, and
output information on the extracted one or more component values as usage states of the one or more resources that are used by each of the multiple processes.

* * * * *